US005631677A

United States Patent [19]

Horigome et al.

[11] Patent Number: 5,631,677

[45] Date of Patent: May 20, 1997

[54] PRINTING APPARATUS AND METHOD OF CHARGING BATTERY THEREIN

[75] Inventors: Hideo Horigome, Tokyo; Junichi Arakawa; Yuichi Kaneko, both of Yokohama; Tetsuhito Ikeda; Akira Kuribayashi, both of Kawasaki, all of Japan

[73] Assignee: Canon Kabushiki Kaisha, Tokyo, Japan

[21] Appl. No.: 699,932

[22] Filed: Aug. 20, 1996

Related U.S. Application Data

[63] Continuation of Ser. No. 115,019, Sep. 2, 1993, abandoned.

[30] Foreign Application Priority Data

Sep. 8, 1992 [JP] Japan .................................... 4-239404
Aug. 27, 1993 [JP] Japan .................................... 5-212714

[51] Int. Cl.[6] .......................... H01M 10/00; G06K 15/00

[52] U.S. Cl. ................................................ 347/19; 320/43

[58] Field of Search ................................ 347/19; 320/43, 320/44; 358/504, 406; 400/88

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,407,003 | 9/1983 | Fukui . |
| 4,459,600 | 7/1984 | Sato et al. . |
| 4,463,359 | 7/1984 | Ayata et al. . |
| 4,558,333 | 12/1985 | Sugitani et al. . |
| 4,577,203 | 3/1986 | Kawamura . |
| 4,608,577 | 8/1986 | Hori . |
| 4,723,129 | 2/1988 | Endo et al. . |
| 4,740,796 | 4/1988 | Endo et al. . |
| 4,759,646 | 7/1988 | Piatt . |
| 5,182,583 | 1/1993 | Horigome et al. . |
| 5,182,655 | 1/1993 | Motoyanagi ............................ 358/406 |

FOREIGN PATENT DOCUMENTS

| | | |
|---|---|---|
| 0442470 | 8/1991 | European Pat. Off. . |
| 0467648 | 1/1992 | European Pat. Off. . |
| 0470545 | 2/1992 | European Pat. Off. . |
| 54-056847 | 5/1979 | Japan . |
| 56-000181 | 1/1981 | Japan . |
| 59-123670 | 7/1984 | Japan . |
| 59-138461 | 8/1984 | Japan . |
| 60-071260 | 4/1985 | Japan . |
| 61-263783 | 11/1986 | Japan . |
| 63-213862 | 9/1988 | Japan . |
| 63-298079 | 12/1988 | Japan . |
| 1110178 | 4/1989 | Japan . |
| 1186354 | 7/1989 | Japan . |
| 1190471 | 7/1989 | Japan . |
| 03263978 | 11/1991 | Japan . |
| 4-85045 | 3/1992 | Japan . |
| 04090360 | 3/1992 | Japan . |
| 04103380 | 4/1992 | Japan . |

*Primary Examiner*—Benjamin R. Fuller
*Assistant Examiner*—Craig A. Hallacher
*Attorney, Agent, or Firm*—Fitzpatrick, Cella, Harper & Scinto

[57] ABSTRACT

A printing apparatus is capable of being driven by a battery for an extended period of time without using a battery having a large capacity, and the battery is capable of being charged while the occurrence of the memory effect is suppressed. Also provided is a method of charging the battery in this apparatus. Battery capacity is detected in the driving interval of a carriage motor and/or conveyance motor. When the battery capacity falls below a predetermined value, control is performed in such a manner that the driving intervals of the carriage motor and conveyance motor will not overlap. When charging of the battery is designated, the battery is discharged using a current load in the apparatus, after which the battery is charged.

37 Claims, 15 Drawing Sheets

FIF. 8
WHEN RESIDUAL CAPACITY OF BATTERY IS SUFFICIENT X≠0
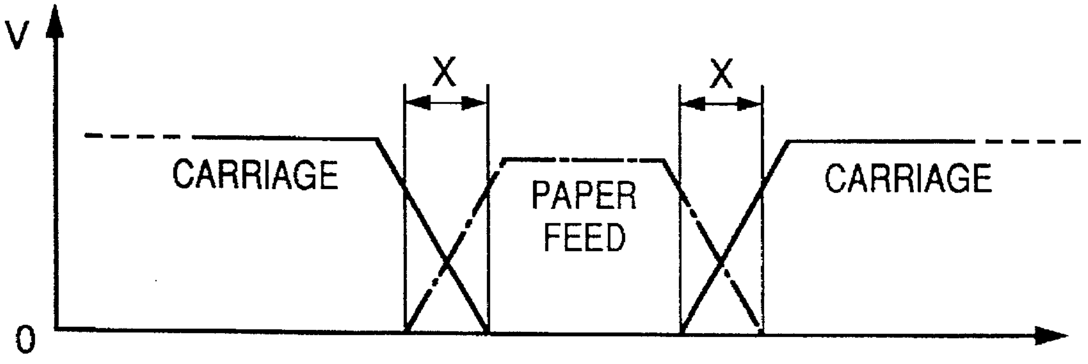
FIF. 9
WHEN RESIDUAL CAPACITY OF BATTERY IS LOW X=0
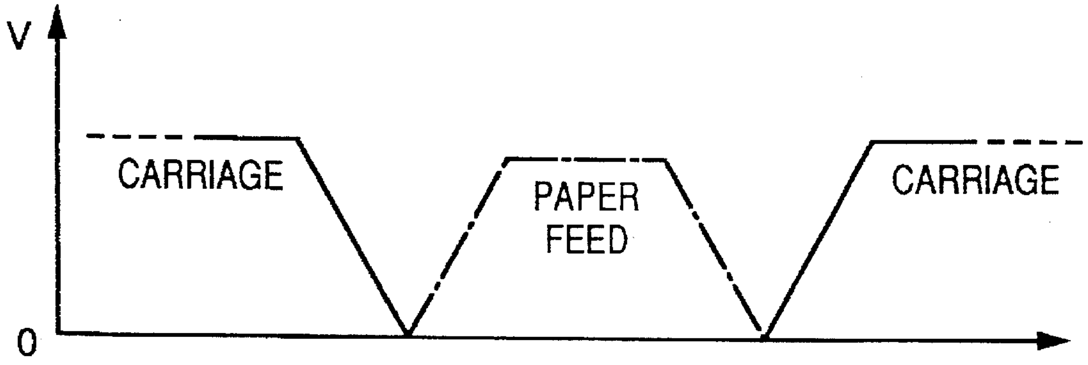

PRINTING APPARATUS AND METHOD OF CHARGING BATTERY THEREIN

This application is a continuation of application Ser. No. 08/115,019, filed Sep. 2, 1993, now abandoned.

BACKGROUND OF THE INVENTION

1. Field of the Invention

This invention relates to a printing apparatus driven by a battery and to a method of charging the battery.

2. Description of the Related Art

In a printing apparatus such as a printer or facsimile machine, the energy driving element of a recording head is driven based upon image information that has been transferred thereto, whereby an image comprising a dot pattern is printed on a recording sheet such as paper or a thin plastic substrate. Depending upon the printing technique, a printing apparatus of this kind can be classified into a number of types, such as an ink-jet type, wire-dot type and thermal type.

In a printing apparatus of this kind, a commercial power supply generally is used as the main power source. In a case where the printing apparatus is of the portable, compact type, a dual power supply arrangement is adopted in which power is capable of being supplied by an AC adapter as well as by a battery. However, in the arrangement wherein the printing apparatus is driven by a battery, it is difficult to drive the components of the apparatus when the output voltage of the battery becomes too low owing to a decline in the residual capacity of the battery. For example, if the printing function ceases owing to a decline in battery voltage during the course of a printing operation, all of the printing information received up to this point vanishes. Further, if such a decline in battery voltage occurs in an ink-jet printing apparatus, a situation can develop in which the ink jetting port of the printing head cannot be capped by a cap member, in which case the nozzle of the ink jetting head may become clogged by dried ink.

Accordingly, in a case where a printing apparatus, especially an ink-jet printing apparatus, is driven by a battery, it is necessary to monitor the capacity of the battery and take some countermeasures when the battery capacity falls below a predetermined value. Generally, in an electronic device driven by a battery, a widely employed technique is to make use of a discharge characteristic in which battery voltage declines with a decrease in battery capacity, with the battery capacity being estimated by detecting the battery voltage. In an ink-jet printing apparatus, the conventional practice is to detect battery voltage and, when the battery voltage falls below a specific voltage, suspend the operation of the apparatus upon determining that the battery capacity is inadequate. The operator is notified of the lack of battery capacity by an indicating element such as a buzzer or lamp.

Generally, in a printing apparatus such as a serial printer, the printing head is mounted on a carriage driven back and forth horizontally by a carriage motor. The recording medium, on the other hand, is conveyed at right angles to the back-and-forth traveling direction of the carriage by conveyor rollers driven by a paper-feed motor. FIG. 8 is a diagram showing the drive timing of the carriage motor and the drive timing of the paper-feed motor. The amount of power consumed during a printing operation is maximum in an interval over which decelerating drive of the carriage motor and accelerating drive of the paper-feed motor overlap, as well as in an interval over which decelerating drive of the paper-feed motor and accelerating drive of the carriage motor overlap (both intervals are indicated by X). The amount of power consumed in these intervals attains a value more than twice that of average power consumption during an ordinary printing operation.

In a case where a battery is employed as the power source, it is required that the printing operation be suspended and that the battery be replaced when battery capacity falls below a predetermined level, even if the battery capacity remaining is comparatively large. The reason for this is to avoid a system-reset operation brought about by a decline of battery voltage in the intervals X. This means that the full capacity of the battery cannot be used, thereby shortening drive time during which the apparatus can be driven between battery exchanges. Accordingly, the only expedient available in order to lengthen drive time by a battery is to use a battery having a larger capacity. Use of such a large-capacity battery not only raises the cost of the apparatus but also leads to an increase in its size and weight and therefore detracts from portability.

A nickel-cadmium (NiCd) battery generally is well known as a large-capacity secondary battery that is capable of being charged. It is known that when a battery of this kind has its final discharge voltage set to a high voltage value of more than 1.1 V/cell and is repeatedly charged and discharged, there is a decline in the discharge capacity or discharge voltage. This phenomenon is known as the "memory effect". This phenomenon will not occur if the battery is charged following discharge to a final discharge voltage of 1.0 V/cell, which is specific to an NiCd battery. In addition, even an NiCd battery in which the memory effect has appeared is capable of being almost fully restored to its original discharge capability. However, in order to protect the conventional printing apparatus before the residual capacity of the battery is completely depleted, operation is terminated automatically when a predetermined voltage value is attained, as mentioned above, and the apparatus cannot be driven unless the battery is charged. Thus, when a comparatively high voltage value is set as the final discharge voltage and the battery is charged when the final discharge voltage is attained, the memory effect develops, there is a decline in the apparent battery capacity and the time during which the apparatus is capable of being driven by the battery shortens further.

A method considered as a countermeasure is to forcibly discharge the remaining capacity of the battery, before charging starts, until the final discharge voltage of the NiCd battery is attained, and then perform charging. With this method, however, a special-purpose discharge circuit for discharging the battery is required. The result is higher cost. Moreover, since such forcible discharging requires 30 minutes to one hour, the total charging time is prolonged.

SUMMARY OF THE INVENTION

Accordingly, an object of the present invention is to provide a printing apparatus in which prolonged drive by a battery is made possible without enlarging battery capacity and by suppressing the memory effect, as well as a method of charging the battery in this apparatus.

Another object of the present invention is to provide a printing apparatus, as well as a method of charging the battery in this apparatus, in which the printing operation is so controlled as to exploit the capacity of a power-source battery fully, thereby making it possible to lengthen printing time by the same battery without any increase in the cost of the apparatus.

A further object of the present invention is to prevent the memory effect, which occurs as a result of insufficient discharging when a chargeable battery is used.

Another object of the present invention is to provide a printing apparatus, as well as a method of charging the battery in this apparatus, in which a power-source battery can be charged to an amount of charge commensurate with the number of pages that the user required to be printed.

Another object of the present invention is to provide a printing apparatus, as well as a method of charging the battery in this apparatus, in which the battery will not run out of power during the printing of a desired number of pages, thereby making it possible to print all of the pages in reliable fashion.

Another object of the present invention is to provide a printing apparatus, as well as a method of charging the battery in this apparatus, in which a decline in apparent battery capacity due to the memory effect can be prevented by charging the battery after the battery has substantially attained the final discharge voltage.

A further object of the present invention is to provide a printing apparatus, as well as a method of charging the battery in this apparatus, in which the battery can be rapidly discharged substantially to the final discharge voltage without providing a discharge circuit for completely discharging the battery.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a diagram showing the drive timings of a carriage motor and paper-feed motor in an ordinary printing apparatus;

FIG. 9 is a diagram showing the drive timings of a carriage motor and paper-feed motor when there is a decline in battery capacity in the printing apparatus of the first embodiment;

DESCRIPTION OF THE PREFERRED EMBODIMENTS

Preferred embodiments of the present invention will now be described in detail with reference to the accompanying drawings.

Figure 1:
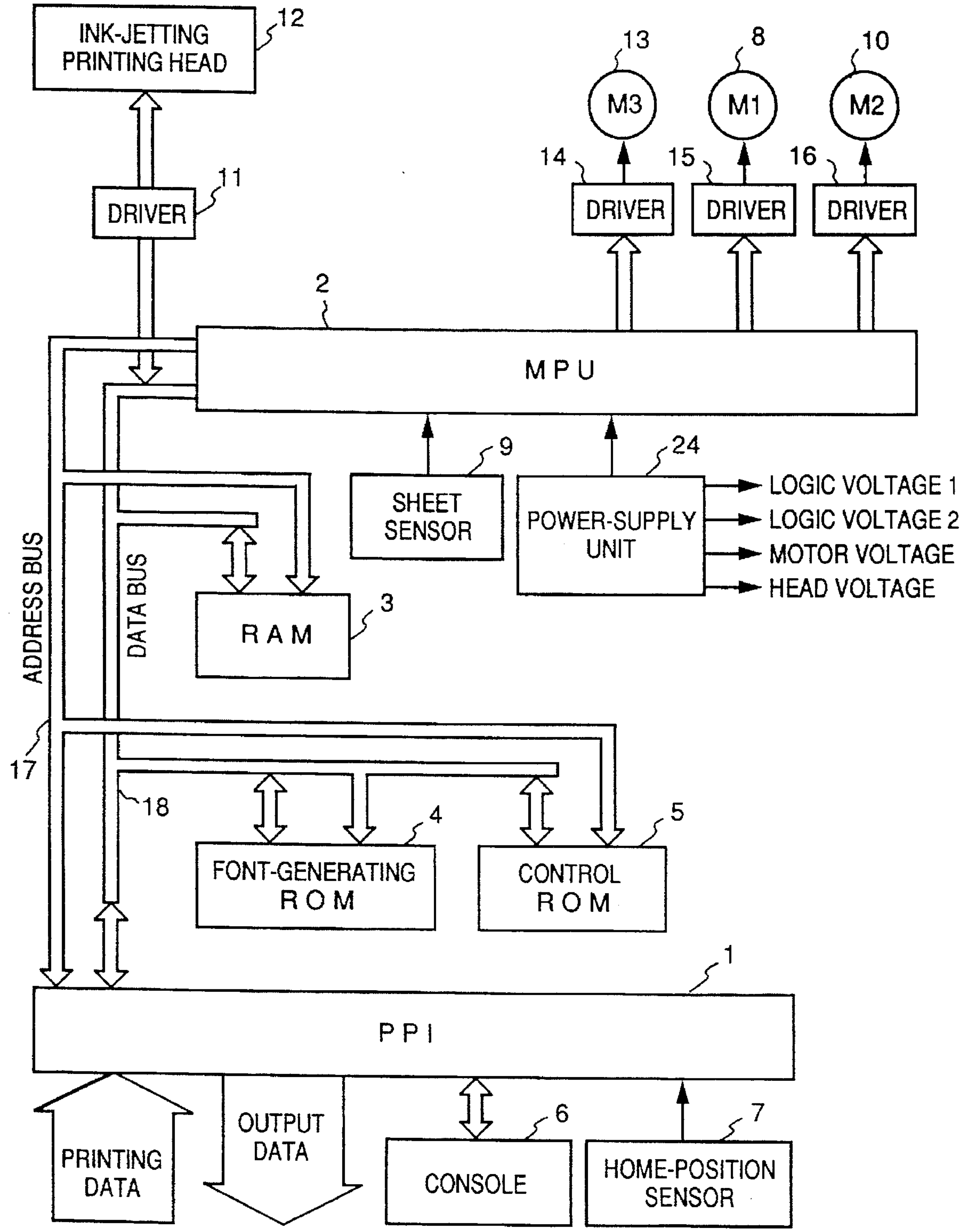
FIG. 1 is a block diagram illustrating the general configuration of the principal portion of an ink-jet printing apparatus according to a first embodiment of the present invention.

FIG. 1 is a block diagram illustrating the general configuration of the principal portion of an ink-jet printing apparatus according to a first embodiment of the present invention. In this embodiment, the printing apparatus described will be of the ink-jet type. However, the invention is not limited to this arrangement and is applicable not only to a printing apparatus using another recording method but also to the printing apparatus of a word processor or facsimile machine.

The apparatus shown in FIG. 1 includes a programmable peripheral interface (hereinafter referred to as a "PPI") 1 for receiving a command signal or recording-information signal, which is sent from a host computer (not shown), and transferring the received signal to an a microprocessing unit (hereinafter referred to as an "MPU") 2. The PPI 1 also exchanges control signals with a console 6 and receives, as an input, a signal from a home-position sensor 7, which senses that a carriage is at the home position. The MPU 2 controls the components of the ink-jet printing apparatus in accordance with a control program stored in a control ROM 5. A RAM 3 stores a received signal or is used as the work area of the MPU 2 for the purpose of temporarily storing various data. A ROM 4 for generating fonts stores pattern information such as characters and symbols in correspondence with code information. In response to an input of code information, the ROM 4 outputs the corresponding pattern information. A ROM 5 for control stores processing procedures (FIGS. 4–7) executed by the MPU 2. These components are controlled by the MPU 2 via an address bus 17 and a data bus 18.

A carriage motor 8 moves a carriage 30 (see FIG. 2), on which a printing head 12 is mounted, in such a manner that the carriage 30 is made to scan back and forth. A paper-feed motor 10 is provided for conveying a recording medium such as paper at right angles to the direction in which the carriage 30 is moved. A capping motor 13 drives a cap portion 32A (see FIG. 2) in such a manner that the cap portion 32A is brought into contact with an ink jetting port (not shown) of the printing head 12, described below, thereby closing the port off from the outside air to prevent the nozzle from drying out. Motor drivers 14, 15 and 16 drive the capping motor 13, the carriage motor 8 and the paper-feed motor 10, respectively. The console 6 is provided with keyboard switches, display lamps and the like. The home-position sensor 7 is provided in close proximity to the home position of the carriage 30 and senses when the carriage, on which the printing head 12 is mounted, has arrived at the home position.

A sheet sensor 9 senses the presence of the recording medium, such as recording paper. More specifically, the sensor 9 senses whether the recording medium has been supplied to the recording section of the apparatus. The ink-jet printing head 12 is provided with a jetting port and a jetting motor, neither of which are shown. A driver 11 drives the jetting motor of the printing head 12 in accordance with the printing information signal. A power-supply unit 24 supplies each of the above-mentioned components with power and has an AC adapter and a battery as driving power-supply devices.

In the arrangement described above, the MPU 2 is connected to a host apparatus such as a computer via the PPI 1 and controls the printing operation based upon the command and printing information signal sent from the host apparatus, the processing procedure of the program stored in the control ROM 5 and the printing information stored in the RAM 3.

Figure 2:
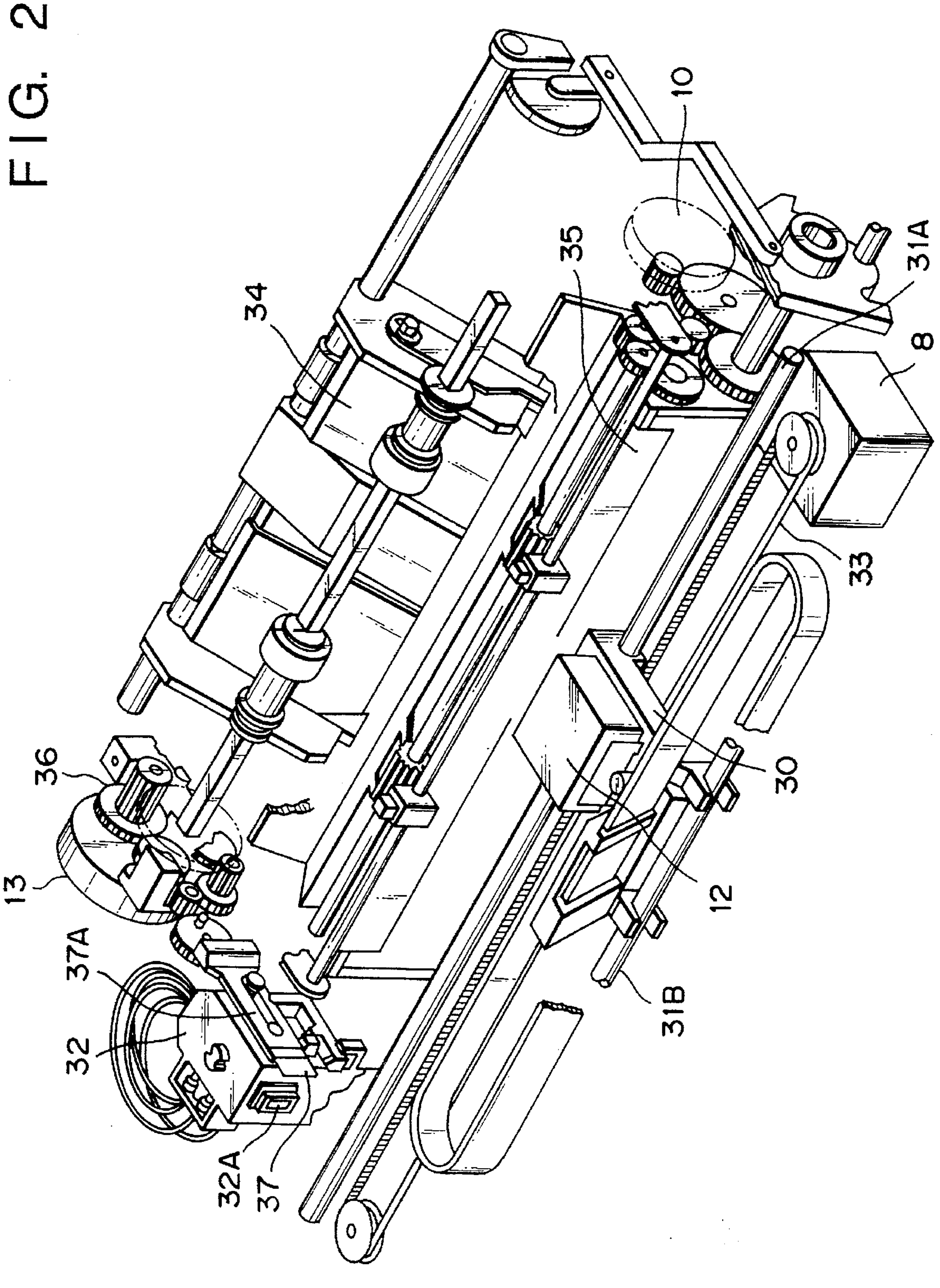
FIG. 2 is a perspective view showing the construction of the recording section of an ink-jet printing apparatus according to this embodiment.

FIG. 2 is a perspective view showing the construction of the printing unit constituting the ink-jet printing apparatus of this embodiment. As shown in FIG. 2, the ink-jet printing head 12 is mounted on the carriage 30 in combination with an ink-jet cartridge capable of being attached to and detached from the carriage 30 through a prescribed method. One or more of the ink-jet cartridges may be provided in accordance with the inks used in printing. The head 12 is provided with an ink tank and an ink sensor, which are not shown. The printing head 12 is supplied, via the driver 11, with an ink jetting signal conforming to printing data from a data supply source arriving via a cable and a terminal connected thereto.

The carriage 30 is coupled to part of a driving belt 33, which transmits the driving force of the carriage motor 8, and is capable of being slid along two parallel, side-by-side guide shafts 31A, 31B, whereby the printing head 12 is capable of being moved back and forth along the entire width of the recording medium. The relative movement between the carriage 30 and the recording medium is controlled by an input of a prescribed printing signal, whereby a desired image is printed on the recording surface of the recording medium, which has been conveyed to a platen 35 from a paper-feed unit 34.

A head restoration unit 32 is disposed at one end of the path of travel of the printing head 12, e.g., at a location opposing the home position. The head restoration unit 32 is operated, through the intermediary of a transmission mechanism 36, by the driving force of the capping motor 13 so as to cap the printing head 12. In operative association with the capping of the printing head 12 by the cap portion 32A of the head restoration unit 32, jetting restoration processing is executed. For example, an ink sucking operation is performed by suitable suction means provided within the head restoration unit 32 or an ink pressure-feed operation is performed by suitable pressurizing means provided in an ink supply passage leading to the printing head 12, as a result of which the ink is forcibly discharged from the ink jetting port to clear highly viscous ink from the ink passageways. Further, at the end of the printing operation, the ink-jetting printer head 12 is capped to protect the head.

Numeral 37 denotes a plate, which consists of silicone rubber or the like, disposed on the side face of the head restoration unit 32 so as to serve as a wiping member. The plate 37 is held in a cantilevered state on a plate holding member 37A and is operated by the capping motor 13 and transmission mechanism 36 in the same manner as the head restoration unit 32 so as to be capable of engaging the jetting surface of the printing head 12. As a result, at a suitable timing in the printing operation of the printing head 12, or after jetting restoration using the head restoration unit 32, the plate 37 is projected into the traveling path of the printing head 12 to wipe off condensation, moisture and dust from the jetting surface of the printing head 12.

The details of the power-supply unit 24 will now be described with reference to the block diagram of FIG. 3.

Figure 3:
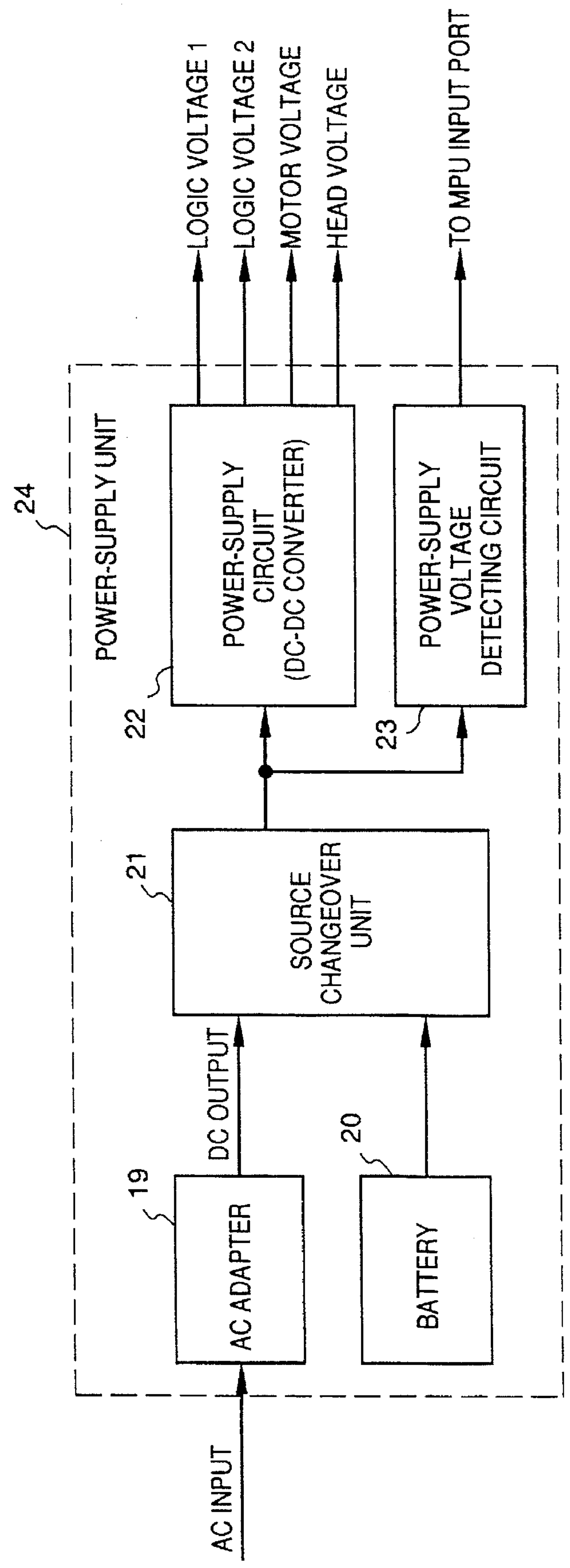
FIG. 3 is a block diagram showing the details of a power-supply unit in FIG. 1.

As shown in FIG. 3, numerals 19 and 20 respectively denote an AC adapter and a battery serving as driving power supplies of the ink-jet printing apparatus. The power-supply unit 24 further includes a supply changeover unit 21, which uses a power-supply jack or the like, for selecting either of these two driving power supplies, and a power-supply voltage detecting circuit 23 for detecting the output voltage of the driving power supply and sending an output signal to an input port. In this embodiment, the detecting circuit employed has a simple construction in which voltage is divided by a resistor and then applied to the MPU 2. However, other possible arrangements include one employing an A/D converter and one using a comparator.

The power-supply unit 24 further includes a power-supply circuit 22 for converting the DC output of the driving power supply to a voltage suitable for driving the components of the ink-jet printing apparatus. Here a logic voltage 1 is supplied to the MPU 2. This voltage is outputted even in a power-off mode. A logic voltage 2 is supplied to logic other than the MPU 2, e.g., the RAM 3; motor voltages are supplied to the motors 9, 10, 13; and a head voltage is supplied to the printing head 12. These voltages are applied only when power is on (in a printing standby state and a printing operating state).

In the ink-jet printing apparatus constructed as set forth above, the printing operation is controlled based upon the results of sensing battery capacity. This control will now be described in general terms.

In an ink-jet printing apparatus, as set forth earlier, battery capacity during the printing operation is monitored at all times and it is necessary to avoid loss of received printing information caused by inadequate battery capacity as well as a situation in which the ink jetting port of the printing head is left unsealed. To this end, it is necessary during the printing operation to detect the battery voltage in an interval of time in which the drop in battery voltage is largest and control the operation of the apparatus in dependence upon the results of detection. During the printing operation of a printing apparatus, maximum power consumption and the maximum drop in battery voltage ordinarily occur in the aforementioned intervals X (FIG. 8), in which there is overlapping of acceleration/de-celeration of the carriage motor 8 and paper-feed motor 10. In this embodiment, therefore, sensing of battery capacity is performed in synchronization with deceleration pulses of the carriage motor 8.

However, if control is performed so as to suspend battery drive upon discriminating battery capacity in the intervals X of overlapping acceleration/deceleration of the two motors, not only will it be impossible to fully exploit battery capacity but this will give rise to the above-described memory effect as well. According to this embodiment, therefore, the drive timings of the motors 8, 10 are changed if the battery capacity falls below that at which drive by the battery was suspended in the prior art, thereby avoiding overlapping of acceleration/deceleration of the carriage motor 8 and paper-feed motor 10 and allowing the printing operation to continue (see FIG. 9). As a result, since the two motors are not driven in an overlapping manner, the maximization of consumed current can be reduced by half. Consequently, since the duration of the drop in battery output voltage that occurs in this interval is reduced, the battery output voltage declines considerably and approaches the final discharge voltage, and the printing operation using the battery is capable of being continued immediately up to the point at which battery capacity is used up.

The control procedure executed by the MPU 2 of the ink-jet printing apparatus according to the first embodiment will be described in detail in accordance with the flowcharts of FIGS. 4 through 7.

FIGS. 4 through 7 are flowcharts illustrating an example of the printing operation according to this embodiment. An overview of this processing is as follows: When the apparatus is driven by the battery, the capacity of the battery is sensed (steps S104, S105) immediately before cap removal processing (step S108) at a transition from the standby state to the start of printing in accordance with printing information from the host apparatus. The reason for this is to prevent the following problem: If battery capacity has fallen to a level at which drive of the carriage 30 and cap portion 32A cannot be assured, the apparatus will cease functioning, or one line will be printed, immediately after the ink jetting port is uncapped in order to start printing. Low battery power is then discriminated by a battery-capacity discrimination step (step S133), which is performed in synchronization with a deceleration pulse of the carriage motor 8, as will be described below. Accordingly, functioning of the apparatus stops without the carriage 30 being returned to the home position and without execution of the protecting operation in which the ink jetting port of the printing head 12 is sealed by the cap portion 32A. Thus, to prevent this from occurring, it is judged at steps S104, S105 whether the battery 20 has enough residual capacity necessary for returning the printing head 12 to the home position and for capping the ink jetting port after at least one line of printing.

Figure 4:
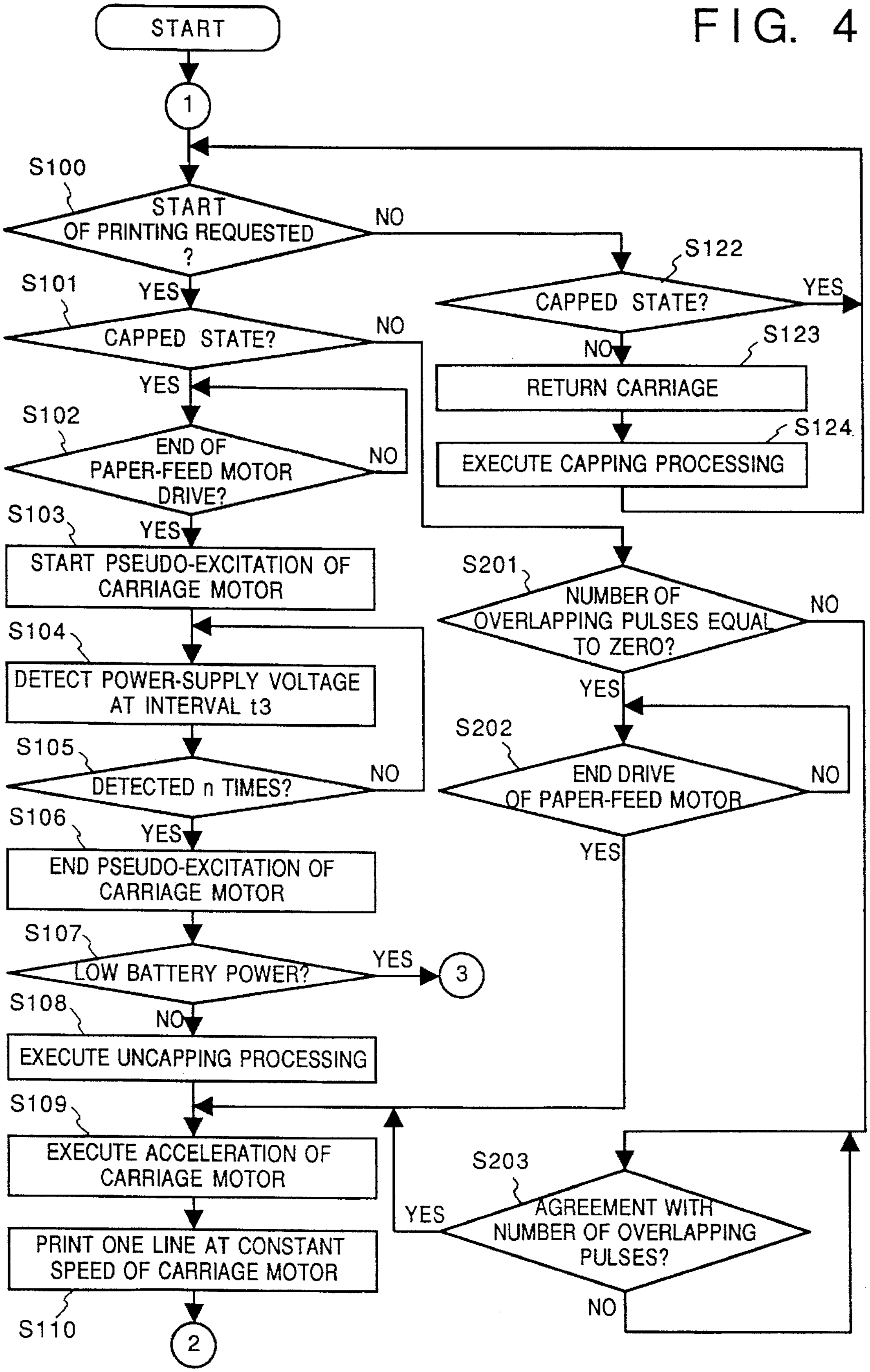
FIG. 4 is a flowchart showing a control procedure in the printing apparatus according to the first embodiment of the invention.
Figure 5:
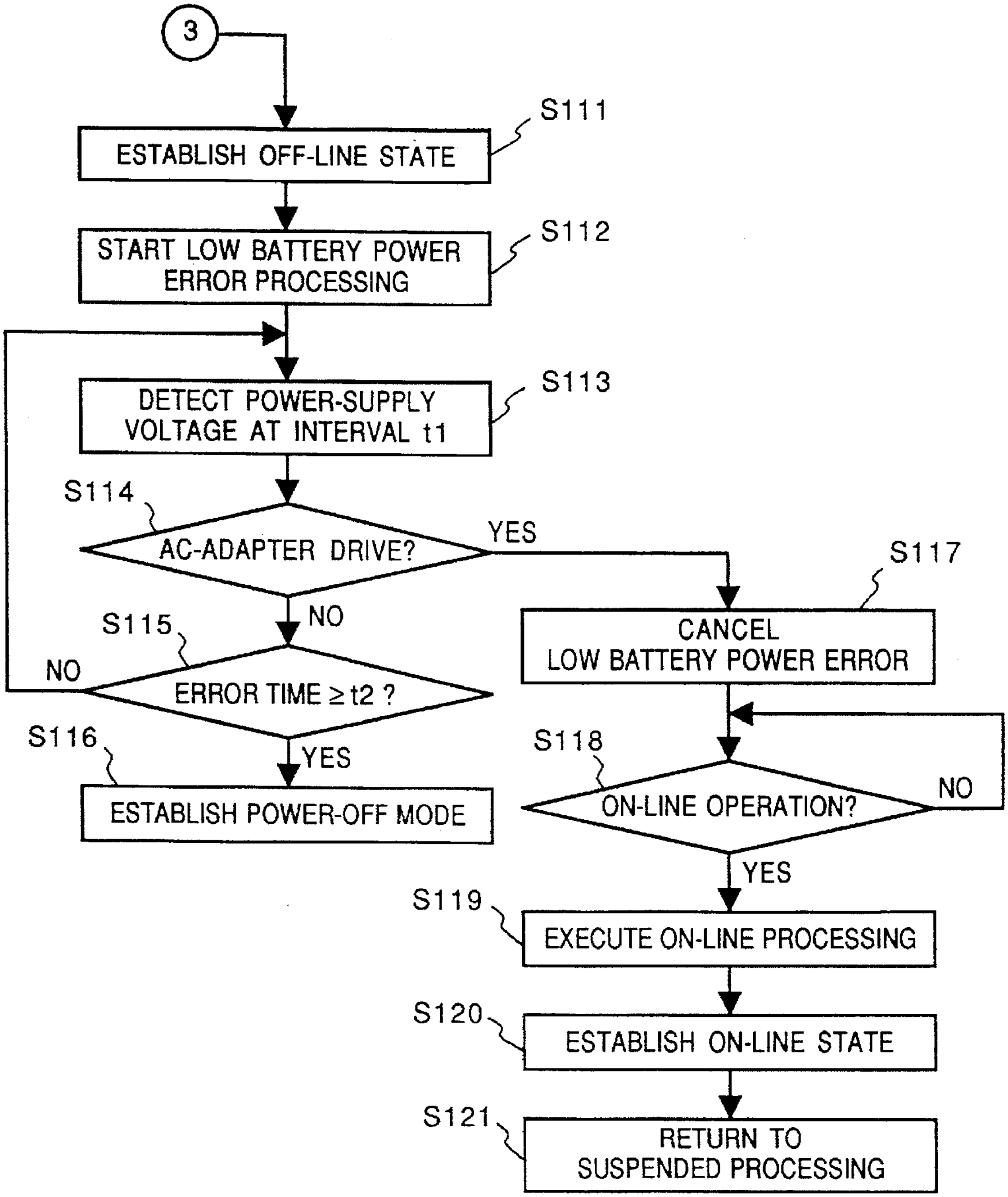
FIG. 5 is a flowchart showing a control procedure in the printing apparatus according to the first embodiment of the invention.

As shown in FIG. 4, it is determined at step S100 whether a print-start request has been generated based upon printing information received from the host apparatus. If start of printing has not been requested, the program branches to steps from S122 onward, at which the system waits for the print-start request in a state in which the ink jetting port of the printing head 12 has been sealed by the cap portion 32A (steps S122~S124).

If a YES answer is obtained at step S100, then the printing operation is started by the procedure from step S101 onward. Specifically, it is determined at step S101 whether the ink jetting port has been capped by the cap portion 32A. If the jetting port is in the uncapped state, then the program proceeds to step S201. The processing from step S201 onward will be described later.

When the capped state is found at step S101, i.e., when the carriage 30 is at the home position and the ink jetting port of the printing head 12 has been capped by the cap portion 32A, the program proceeds to step S102 and it is determined whether the paper-feed motor 10 is being driven. If the motor is being driven, the apparatus waits until drive ends. If the motor 10 is not being driven, however, then it is determined by the procedure of steps S103~S107 whether the battery 20 has enough capacity to allow uncapping (this procedure is for sensing low-power error).

Specifically, at step S103 a discharge load suitable for sensing capacity is applied to the battery 20 in order to sense the capacity of the battery 20 in an accurate manner. In this embodiment, a discharge load suited to the battery 20 is applied by exciting the carriage motor 8 without changing its phase (this is referred to as "pseudo-excitation"). Alternatively, it is permissible to use a method in which the paper-feed motor 10 is subjected to pseudo-excitation or a method in which both the carriage motor 8 and paper-feed motor 10 are subjected to pseudo-excitation.

The program then proceeds to step S104, at which the output voltage of the battery 20 is detected by the power-supply voltage detecting circuit 23 after the elapse of time $t_3$ (e.g., 50 msec). If this operation has been repeated n times via step S105, the program proceeds to step S106, at which pseudo-excitation of the carriage motor 8 is terminated. Next, on the basis of the results of detection performed n times via steps S104 and S105, it is determined at step S107 whether battery power is low (i.e., whether the output voltage of battery 20 is less than a predetermined value). More specifically, the average value of the battery voltage detected n times is calculated and the power of the battery is judged to be too low if the average value is less than a preset final discharge voltage. Otherwise, the battery power is not considered to be too low. It should be noted that the set value of final discharge voltage is stored in the control ROM 5 in advance.

Figure 6A:
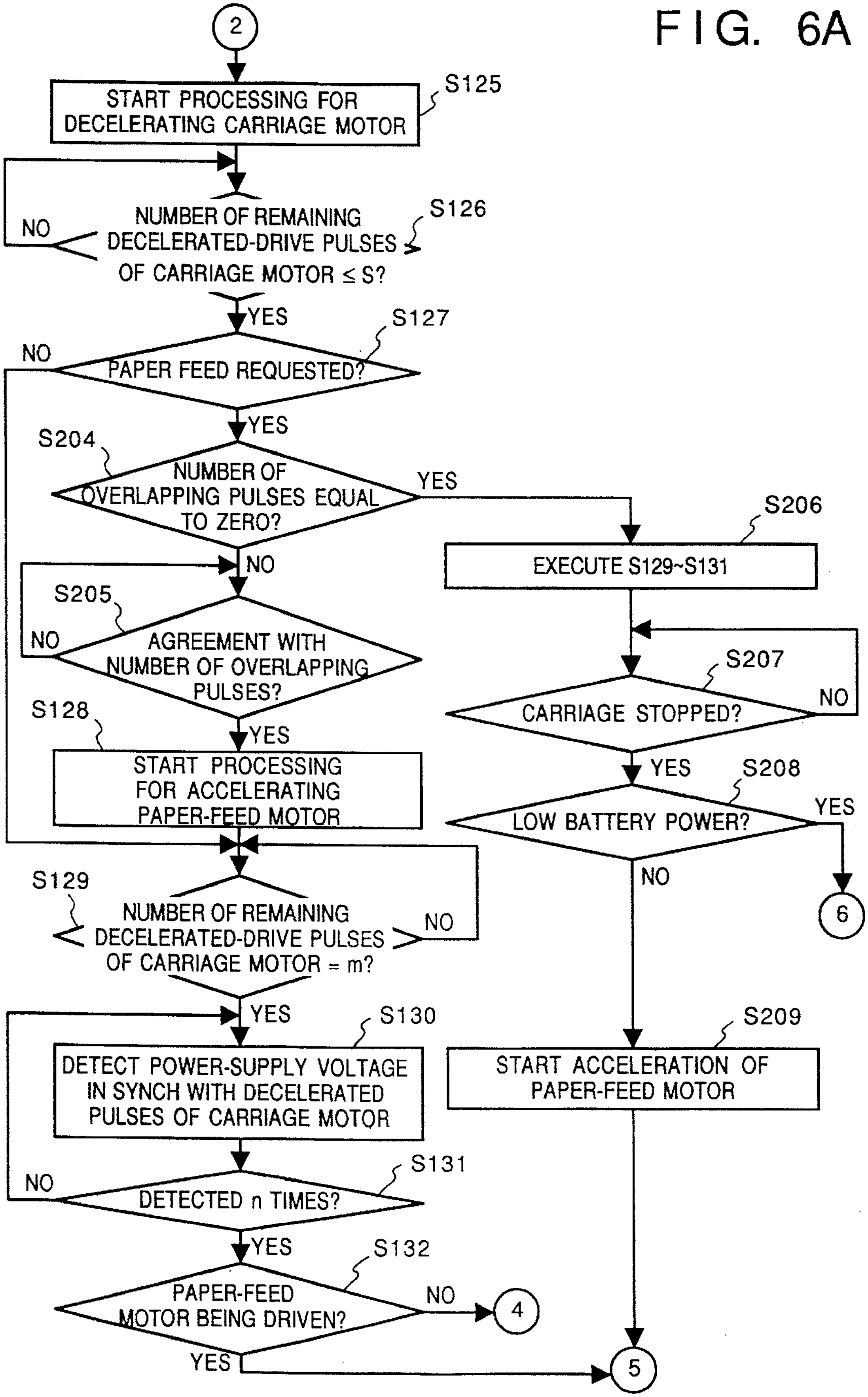
FIGS. 6A and 6B are flowcharts showing a control procedure in the printing apparatus according to the first embodiment of the invention.

If the determination made at step S107 is that the battery power is not too low, the program branches to step S108 (uncapping processing) and acceleration of the carriage motor 8 is started (step S109) after uncapping processing is executed. At the end of acceleration, one line is printed (step S110) while the carriage is moved at a constant speed (i.e., while the carriage motor 8 is rotatively driven at a constant speed), after which the program proceeds to step S125 (FIG. 6A).

If battery power is found to be low at step S107, uncapping processing is canceled to prevent the ink jetting portion of the printing head 12 from being left open to the outside air. Further, protection of printing information already received is achieved by the procedure from step S111 onward. This processing will now be described.

First, the apparatus is placed in the off-line state with respect to the host apparatus at step S111 and then a transition is made to a low-power error at step S112. That is, in the low-power error state, interrupt processing other than initiated by the power switch on the console 6 is inhibited and the operator is notified of the low-power error by alarm means such as a buzzer or LED. Control from step S113 onward is then executed. This will now be described.

At steps S113, S114, detection and decision operations are performed to determine whether the operator has connected the AC adapter 19 to the printing apparatus to restore the output voltage of the power supply. If the AC adapter 19 has been used to restore the power-supply voltage, the program branches to step S117, where the low-power error state is canceled. Here printing information from the host apparatus is not received in the off-line state, but printing information that has been received up to the moment of error generation and that has not yet been subjected to printing processing is held in the RAM 3. Accordingly, it is determined at step S118 whether the operator has performed an on-line operation to make possible the reception of data from the host apparatus. When the on-line state is established, the program proceeds to step S119, where processing for restoring the apparatus to the on-line state with respect to the host apparatus is executed. The program then proceeds to step S120, at which the transition to the on-line state is made so that data from the host apparatus can be received. In addition, a return is made to processing that was suspended by generation of the low-power error. If there is printing information that has not yet been printed, processing for printing this information is started.

If the AC adapter 19 is not connected by the operator during the monitoring operation of steps S113~S115, which are for determining whether the power-supply voltage has been restored within a fixed time $t_2$ (e.g., 5 min) from generation of the error, it is determined that the battery has been expended and power is turned off automatically at step S116 before the printing apparatus becomes uncontrollable.

The foregoing is the control procedure from the state in which the ink jetting nozzle is capped to the start of printing in response to a print-start request.

Figure 6B:
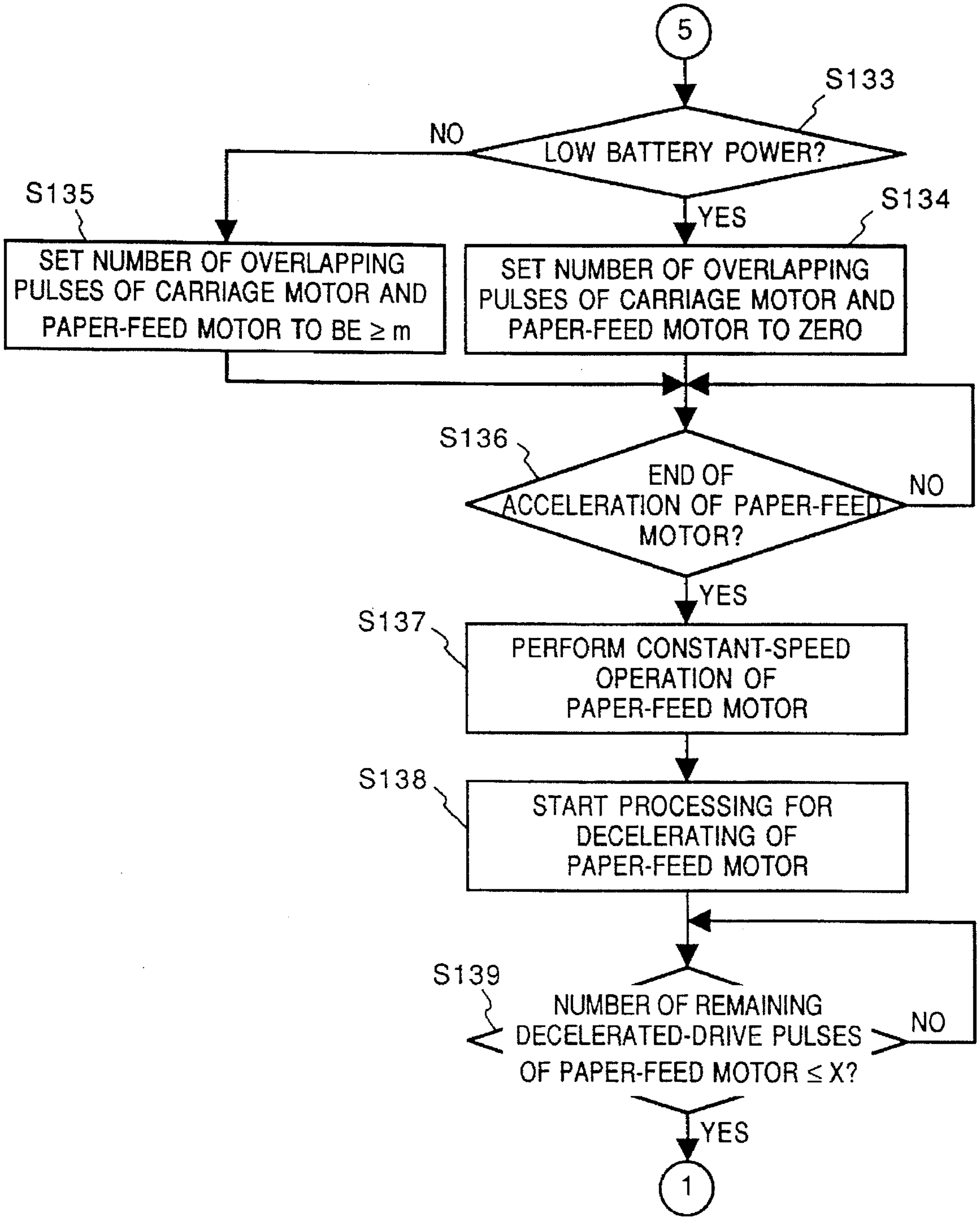
Figure 7:
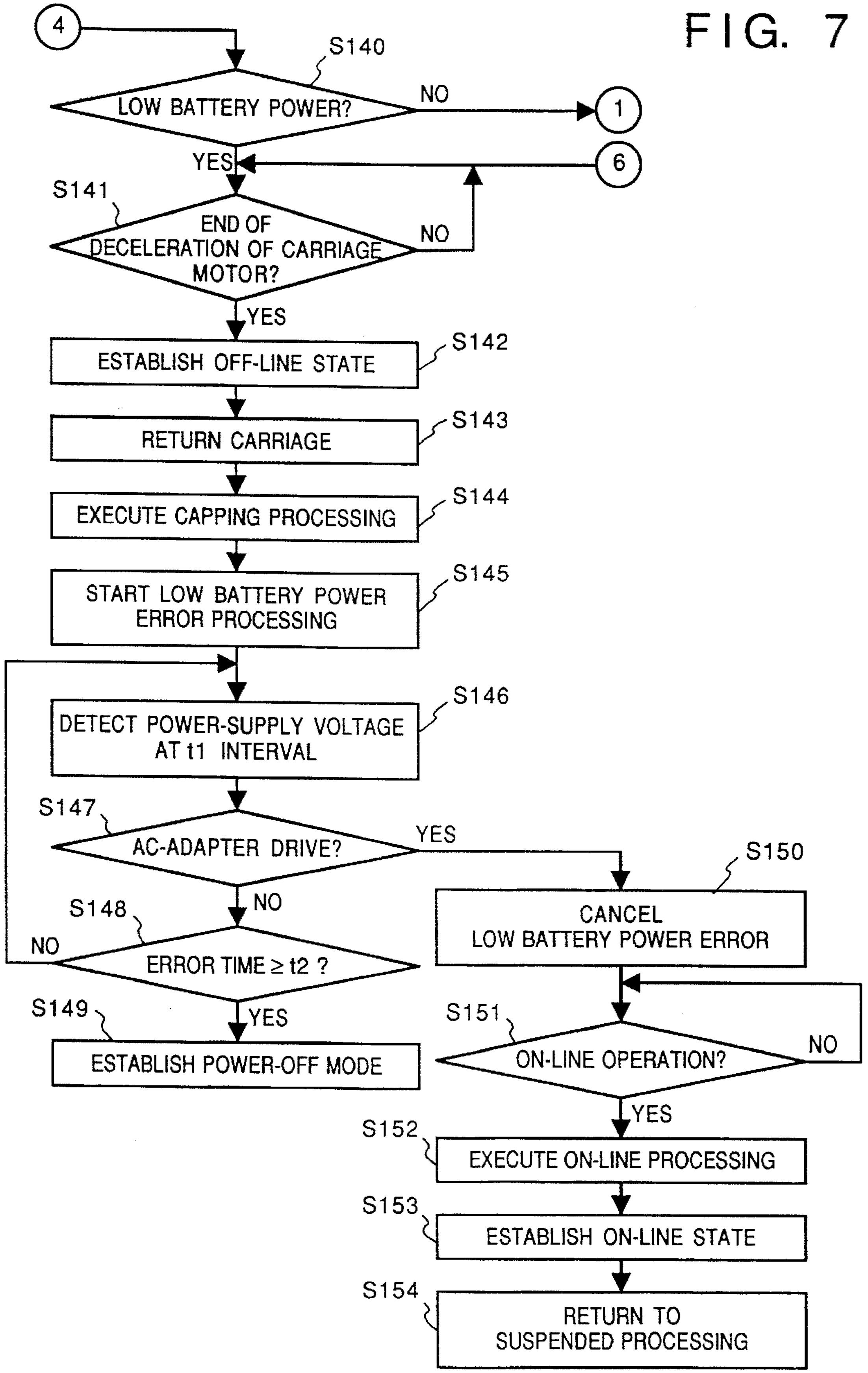
FIG. 7 is a flowchart showing a control procedure in the printing apparatus according to the first embodiment of the invention.

The control procedure during a printing operation will now be described with reference to FIGS. 6A, 6B and 7.

In short, this processing involves sensing the capacity of the battery 20 during printing, this being performed one time, whenever one line is printed, while the carriage motor 8 is being decelerated. In this embodiment, the printing operation is controlled in two stages based upon the results of sensing the output voltage of the battery.

In the first stage, the drive timings of the carriage motor 8 and paper-feed motor 10 are changed over in such a manner that the two motors will not be driven in overlapping fashion. Specifically, since output voltage of the battery falls with a decline in the residual capacity of the battery 20, a voltage drop due to the internal resistance of the battery 20 increases temporarily when the carriage motor 8 and paper-feed motor 10 are driven simultaneously. Consequently, even through depletion of battery capacity has not yet been attained, there is the possibility that system reset of the apparatus will be activated owing to the temporary drop in battery voltage, as a result of which the printing operation will cease with attendant loss of the printing information already received. Accordingly, the battery capacity is sensed in the interval during which power consumption of the apparatus is maximized, namely in the interval during which the carriage motor 8 and paper-feed motor 10 are driven in overlapping fashion, and a changeover is performed in such a manner that the driving operations of the motors 8 and 10 will not overlap (step S134). As a result, a state in which the battery voltage temporarily falls by a wide margin is suppressed so that the printing operation is allowed to continue. Accordingly, battery capacity can be fully exploited and drive by the battery can be performed for a longer period of time without increasing the capacity of the battery.

Next, in the second stage, battery capacity is sensed in a state in which the printing operation is performed without overlapping drive of the carriage motor 8 and paper-feed motor 10, and measures for protecting the apparatus (low-power error processing) are taken by interrupting the printing operation before the apparatus ceases functioning owing to depletion of the battery. In the second stage, drive of the carriage motor 8 and drive of the paper-feed motor 10 do not overlap, as mentioned above. Therefore, even though sensing of the capacity of battery 20 is performed during decelerated drive of the carriage motor 8 in the same manner as sensing of battery capacity in the first state, the drop in the battery voltage is reduced to half that in the first stage. In this embodiment, therefore, the reference voltage value for judging the capacity of the battery is the same value for both the first and second stages.

The details of the operation control procedure set forth above will now be described with reference to the flowcharts of FIGS. 6A, 6B and 7.

As shown in FIG. 6A, decelerated drive of the carriage motor 8 is started at step S125. Next, the program proceeds to step S126. Here, if the number of remaining decelerated-drive pulses of the carriage motor 8 falls below a preset number S of pulses, it becomes possible to start drive of the paper-feed motor 10. If it is found at step S127 that there is no paper-feed request, the program proceeds to step S129.

Step S129 calls for the system to wait until the number of remaining decelerated-drive pulses of the carriage motor 8 attains the preset number S (i.e., until the relation m≦S is attained). When this relation is attained, the program proceeds to step S130, where the battery capacity is sensed by detecting the power-supply voltage when there is a changeover in excitation phase of the carriage motor 8. When the detection of power-supply voltage is performed n times at step S131, the program proceeds to step S132, where it is determined whether the paper-feed motor 10 is being driven. If it is found that the paper-feed motor 10 is being driven, then the program proceeds to step S133. Here it is determined whether it is necessary to change the number of pulses of overlapping drive of the carriage motor 8 and paper-feed motor 10 in dependence upon the battery capacity sensed at steps S130, S131.

When it is found at step S132 that the paper-feed motor 10 is not being driven, the program branches to step S140 (FIG. 7), where it is determined whether it is necessary to perform low-power error processing based upon the battery capacity sensed at steps S130, S131.

Processing from step S133 onward for the case in which the paper-feed motor 10 is being driven will be described first.

In a case where sufficient battery capacity is found to remain at step S133, the program proceeds to step S135, at which the overlapping number of pulses is set to be equal to or greater than m (m≧n≠0; where m, n are integers). If battery power is found to be too low at step S133, however, then the program proceeds to step S134, whereby overlapping pulse number is set to zero. When the processing of step S134 or S135 is concluded, the program proceeds to steps S136, S137, where acceleration of the paper-feed motor 10 and constant-velocity operation are performed. Thereafter, decelerated rotation of the paper-feed motor 10 is started at step S138. The program then proceeds to step S139, at which it is determined whether the number of remaining pulses of decelerated drive of the paper-feed motor 10 has fallen below the number of overlapping pulses set at steps S134, S135. If the answer is YES, then the program returns to step S100 in FIG. 4 and the above-described processing is repeated.

If a paper-feed request is received at step S127, the program proceeds to step S204, at which it is determined whether the number of overlapping pulses is zero or not. When this number is not zero, the program proceeds to step S205, at which it is determined whether a number that agrees with a designated overlapping-pulse number has been attained. If the answer obtained here is YES, then the program proceeds to step S128, where acceleration of the paper-feed motor 10 is started. If the overlapping-pulse number is zero, however, the program proceeds to step S206, at which the aforesaid steps S129~S131 are executed to detect the power-supply voltage. The system waits for the carriage motor 8 to stop rotating at step S207, after which it is determined at step S208 whether a power-supply voltage has been attained at which operation cannot be continued. If such is the case, then the program proceeds to step S141, where the carriage motor 8 is decelerated and rotation thereof halted. The off-line state also is established. If operation still cannot continue at step S208, the program proceeds to step S209, at which acceleration of the paper-feed motor 10 is started, in the same manner as at step S128, and then the program proceeds to step S133.

If the ink jetting port of the printing head 12 has not been capped the cap portion 32A at step S101, the program proceeds to step S201, at which it is determined whether the number of overlapping-pulse is zero or not. When this number is not zero, the program proceeds to step S203, at which it is determined whether or not a number agrees with the overlapping-pulse number. If the answer obtained here YES, the program proceeds to step S109, where acceleration of the carriage motor 8 is started. At step S201, if the overlapping-pulse number is zero, then the program proceeds to step S202, at which the system waits for the paper-feed motor 10 to stop rotating. After that, the program proceeds to step S109.

When it is found at step S132 that the paper-feed motor 10 is not being driven, the program proceeds to step S140, at which it is determined whether it is necessary to perform low-power error processing. If this processing is not necessary, then the program returns to step S100 of FIG. 4 so that the control procedure described thus far is repeated. If the low-power error processing is necessary, on the other hand, the program proceeds to step S141, where the system waits for the end of processing for decelerating the carriage motor 8. When this processing ends, low-power error processing is executed through a procedure from step S142 onward.

The apparatus is put on line at step S142, the carriage 30 is returned to the home position at step S143 and the printing head 12 is capped at step S144. Since the control procedure of steps S145~S154 is identical with the processing of steps S112~S121 of FIG. 5 described above, this procedure need not be described again.

FIG. 9 is a diagram schematically showing the drive timings of the carriage motor 8 and paper-feed motor 10 in a case where zero has been set as the number of overlapping pulses in the interval X in which drive of the carriage motor 8 and drive of the paper-feed motor 10 overlap.

In accordance with the first embodiment, as described above, the printing operation is controlled in such a manner that the capacity of the power-supply battery can be fully exploited, thereby making it possible to prolong printing time by one and the same battery without inviting an increase in the cost of the apparatus.

Further, in a case where a chargeable battery such as an NiCd battery is used, it is possible to prevent the memory effect, which occurs because the battery cannot be discharged sufficiently.

A second embodiment of the present invention will now be described with reference to FIGS. 10 through 12.

Figure 10:
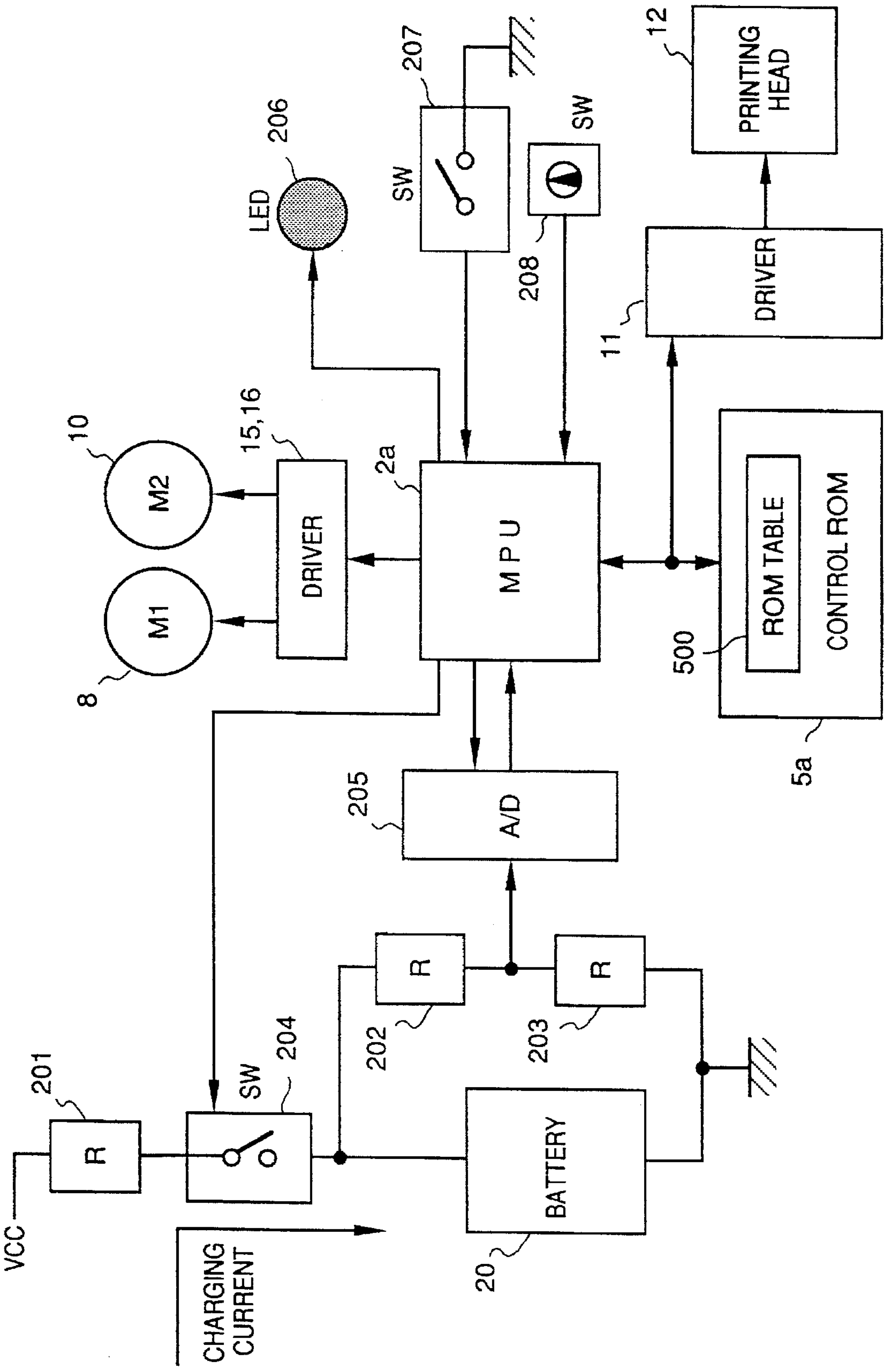
FIG. 10 is a block diagram illustrating the general configuration of the principal portion of an ink-jet printing apparatus according to a second embodiment of the present invention.

FIG. 10 is a block diagram illustrating the general configuration of an ink-jet printing apparatus according to a second embodiment of the present invention. Elements corresponding to those shown in FIG. 1 are designated by like reference characters and need not be described again.

The apparatus shown in FIG. 10 includes loading resistors 201~203, and a switch 204 closed under control of an MPU **2*a* when the battery 20 is charged. With regard to the charging power at this time, electric power from the AC adapter 19 is converted by the power-supply circuit 22 and the converted power is supplied to the battery 20. The apparatus further includes an A/D converter 205, the input to which is the output voltage of the battery 20 voltage-divided by the loading resistors 202, 203, for A/D converting this input and delivering the resulting digital signal to the MPU 2*a*. As a result, the MPU 2*a* is capable of detecting the battery capacity of the battery 20. The apparatus is further provided with a user-operated switch 207 which, by being closed, commands the start of a charging operation, a switch 208 for setting the number of pages to be printed, and a display device (LED) for notifying the operator of the fact that the battery 20 has been charged enough to enable printing of the number of pages set by the switch 208**.

In accordance with this arrangement, the user employs the switch 208 to set the number of pages to be printed and then commands the start of charging by using the switch 207. When this has been done, the MPU **2*a* reads the number of pages set by the switch 208, refers to a ROM table 500 and obtains the battery charging level that conforms to the set number of pages. The MPU 2*a* then lights the LED 206 to inform of the fact that the charging operation has started, reads the digital data from the A/D converter 205 and determines whether the battery 20** has attained the prescribed voltage level. If the prescribed level has been attained, charging is unnecessary and processing is ended in this state.

If the prescribed level has not been attained, however, the MPU **2*a* closes the switch 204 to start the charging of the battery 20. The MPU 2*a* then reads the output value of the A/D converter 205 at fixed time intervals and determines whether the charging voltage of the battery 20 has attained a predetermined voltage value. If the voltage of battery 20 has attained the predetermined voltage value, the MPU 2*a* opens the switch 204, extinguishes the LED 206** and terminates charging processing.

Figure 11:
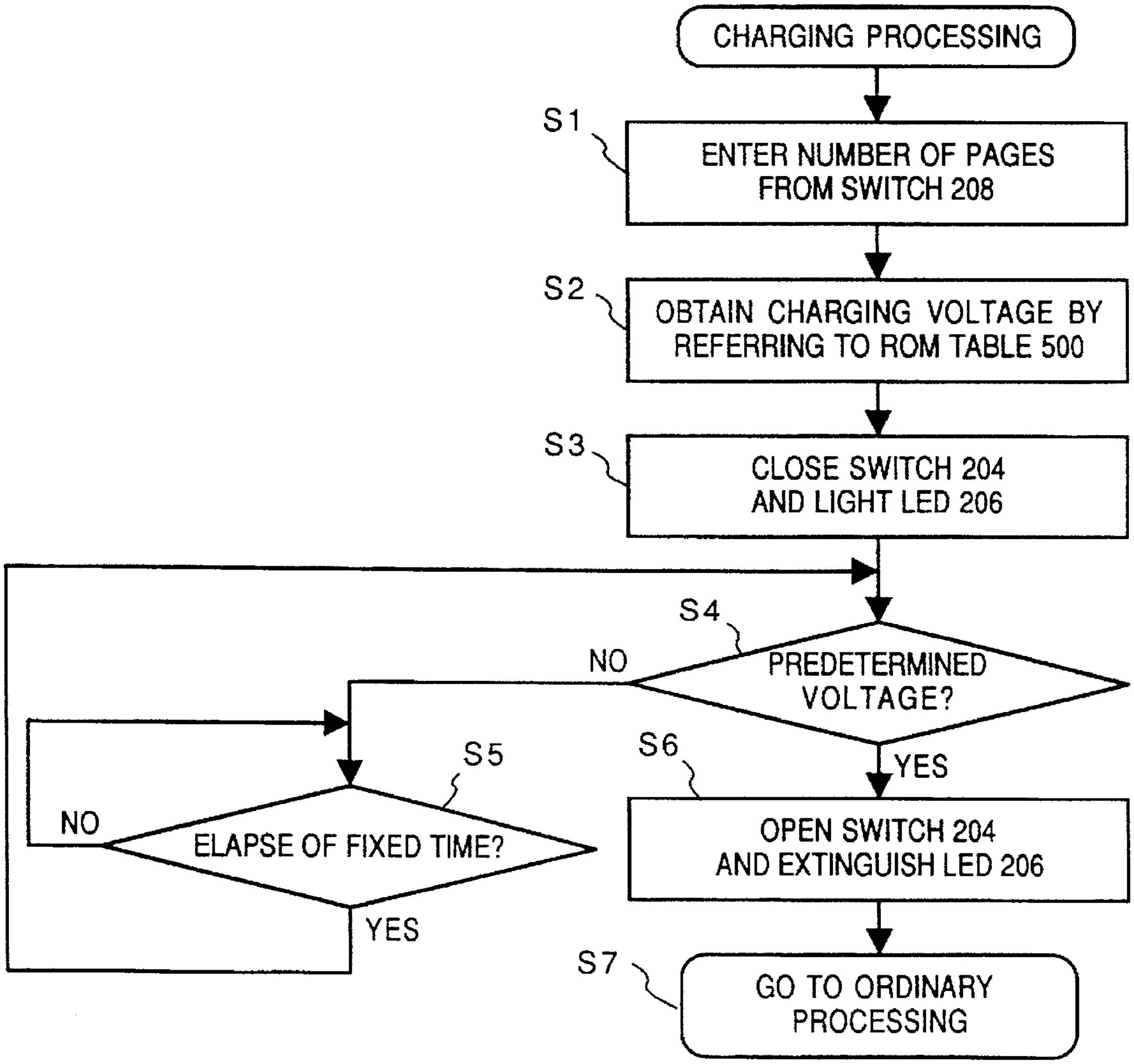
FIG. 11 is a flowchart showing a control procedure in the printing apparatus according to the second embodiment of the invention.

FIG. 11 is a flowchart showing the charging processing in the ink-jet printing apparatus according to the second embodiment. The control program for executing this processing is stored in a control ROM **5*a*** in advance.

This processing is initiated by pressing the switch 207 to enter a command for starting charging. The number of pages set by the switch 208 is entered at step S1, after which the charging voltage of the battery 20 corresponding to this number is found by referring to the ROM table 500. The program proceeds to step S3, at which the switch 204 is closed and the LED 206 is lit. The output of the A/D converter 205 is investigated at step S4, at which it is determined whether the charging voltage of the battery 20 has attained the prescribed voltage found at step S2. If the prescribed voltage has not been attained, the program proceeds to step S5, at which the system waits for the elapse of a prescribed period of time before the program returns to step S4.

If the prescribed voltage is attained at step S4, then the program proceeds to step S6, where the switch 204 is opened to end charging of the battery 20 and the LED 206 is extinguished to notify of the end of charging.

Thus, in accordance with the second embodiment, the battery can be charged an amount commensurate with the number of pages desired to be printed out by the user. This has the effect of shortening charging waiting time.

Another advantage of this embodiment is that depletion of the battery, which might otherwise occur during the printing of the desired number of pages, is prevented.

Figure 12:
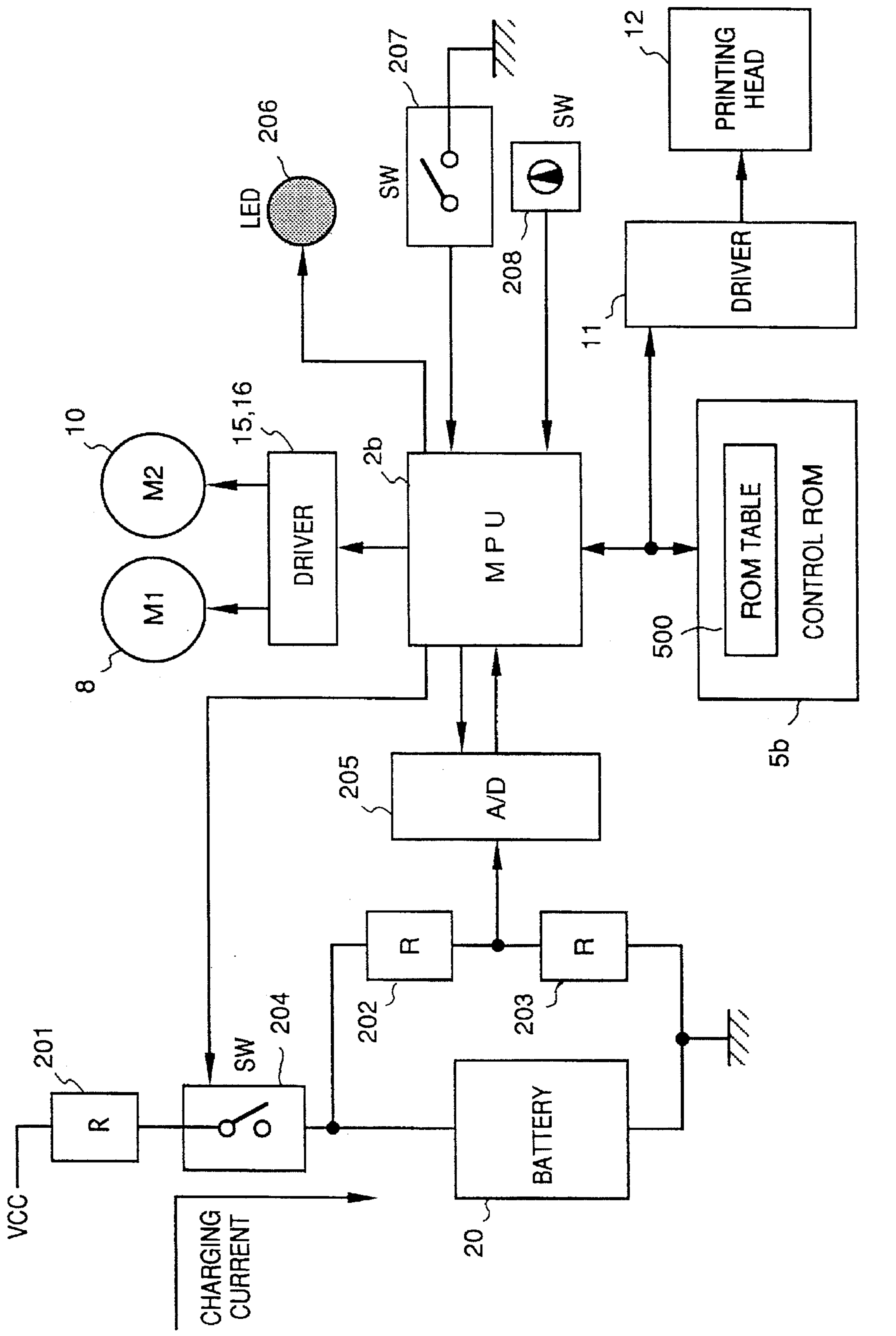
FIG. 12 is a block diagram illustrating the general configuration of the principal portion of an ink-jet printing apparatus according to a modification of the second embodiment of the present invention.

FIG. 12 is a diagram showing a modification of the second embodiment, in which portions corresponding to those of the foregoing drawings are designated by like reference characters and need not be described again.

Here the LED 206 is deleted. When the battery 20 is charged to allow printing of the designated number of pages, the printable number of pages are printed out by the printing head 12. As a result, charging time is shortened and the user is capable of being informed of the number of printable pages in the same manner as set forth in the second embodiment. In this case, instead of the LED 206 being extinguished at step S6 in the flowchart of FIG. 11, the MPU 2*a* refers to the charging voltage entered from the A/D converter 205 and the printable number of pages corresponding to this voltage value obtained from the ROM table 500, obtains the number of pages, generates the corresponding character patterns from the font generating ROM 4 and outputs these character patterns to the printing head 12.

A third embodiment of the invention and a modification of this embodiment will now be described with reference to FIGS. 13 through 15. In this embodiment, the construction of the apparatus is the same as that of the second embodiment.

According to the third embodiment, the above-described memory effect of the battery is prevented. To this end, the charging operation is performed after the battery fully attains the final discharge voltage, thereby preventing the decline in apparent battery capacity caused by the memory effect of the battery.

This processing is started by commanding the start of charging of battery 20 by the switch 207. As shown in FIG. 13, it is determined at step S11, based upon the output of the A/D converter 205, whether the output voltage of the battery 20 has attained the final discharge voltage. If it has, the program proceeds to step S15 so that the charging is started as indicated by the flowchart of FIG. 11.

If it is found at step S11 that the final discharge voltage has not been attained, then the program proceeds to step S12, where the carriage motor 8 is rotatively driven to consume the power of the battery 20. It is then determined at step S13 whether the voltage of the battery 20 has attained the final discharge voltage. If the final discharge voltage has been attained, the program proceeds to step S14, at which rotation of the carriage motor 8 is halted, and then to step S15, at which charging of the battery 20 is started. The output of the A/D converter 205 is examined at step S15 to determine whether the battery 20 has been charged sufficiently. If the answer is YES, then the program proceeds to step S17 and the charging operation is concluded.

Figure 13:
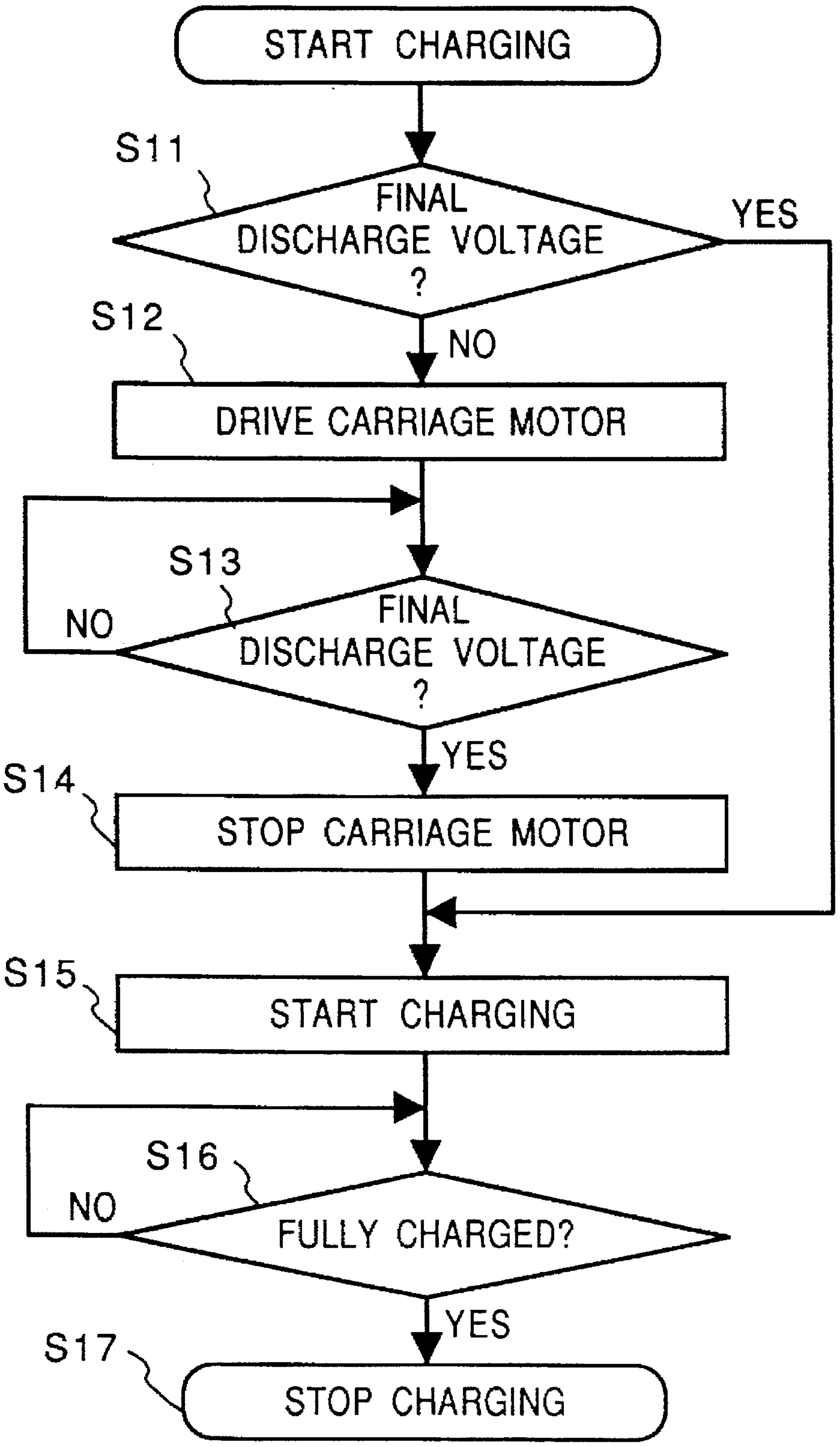
FIG. 13 is a flowchart showing a control procedure in the printing apparatus according to the third embodiment of the invention.
Figure 14:
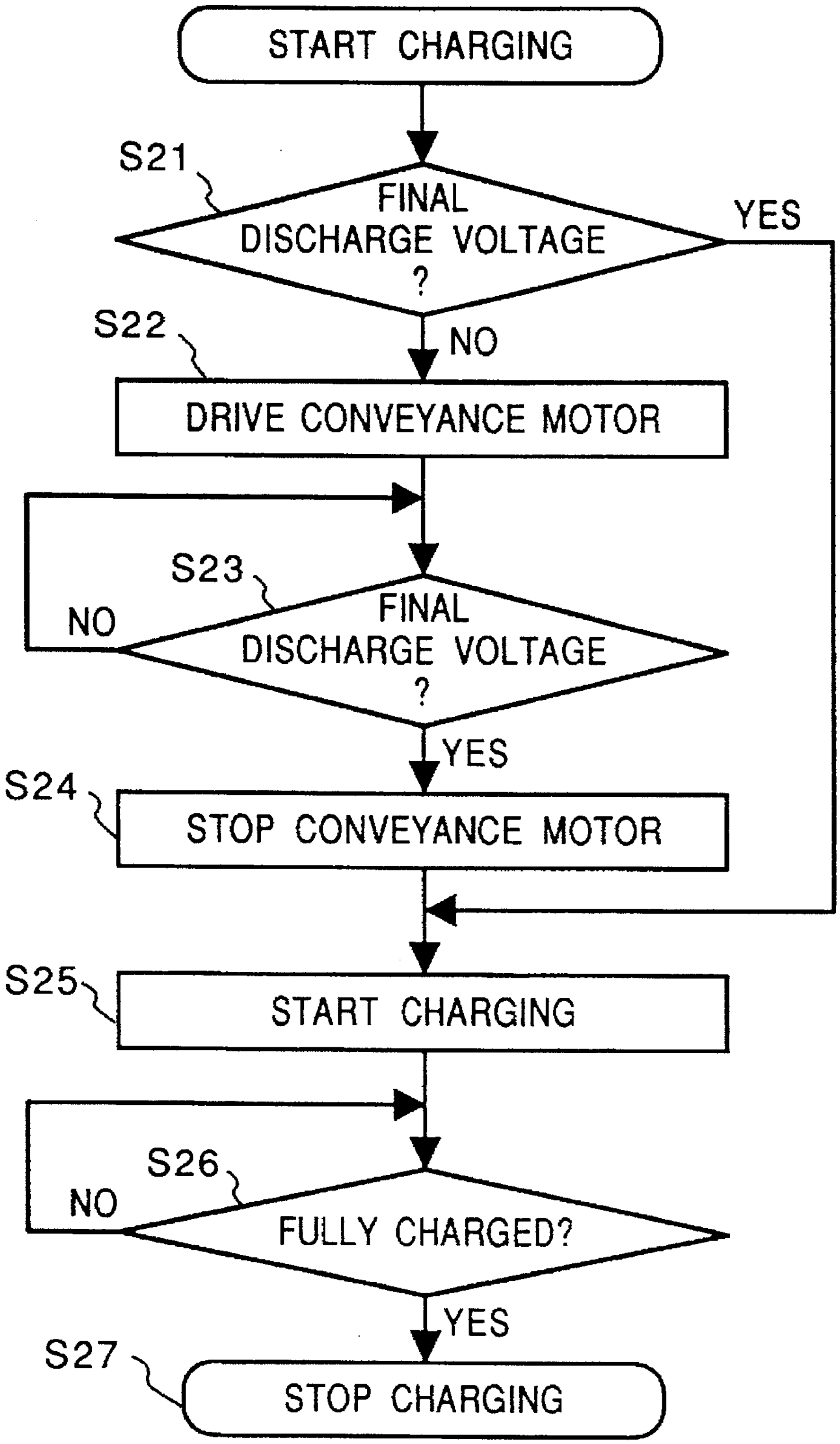
FIG. 14 is a flowchart showing a control procedure of a modification of the third embodiment.

FIG. 14 is a flowchart illustrating charging processing similar to that of the flowchart of FIG. 13. Here, in order to consume the battery 20, the paper-feed motor 10 is driven instead of the carriage motor 8.

Figure 15:
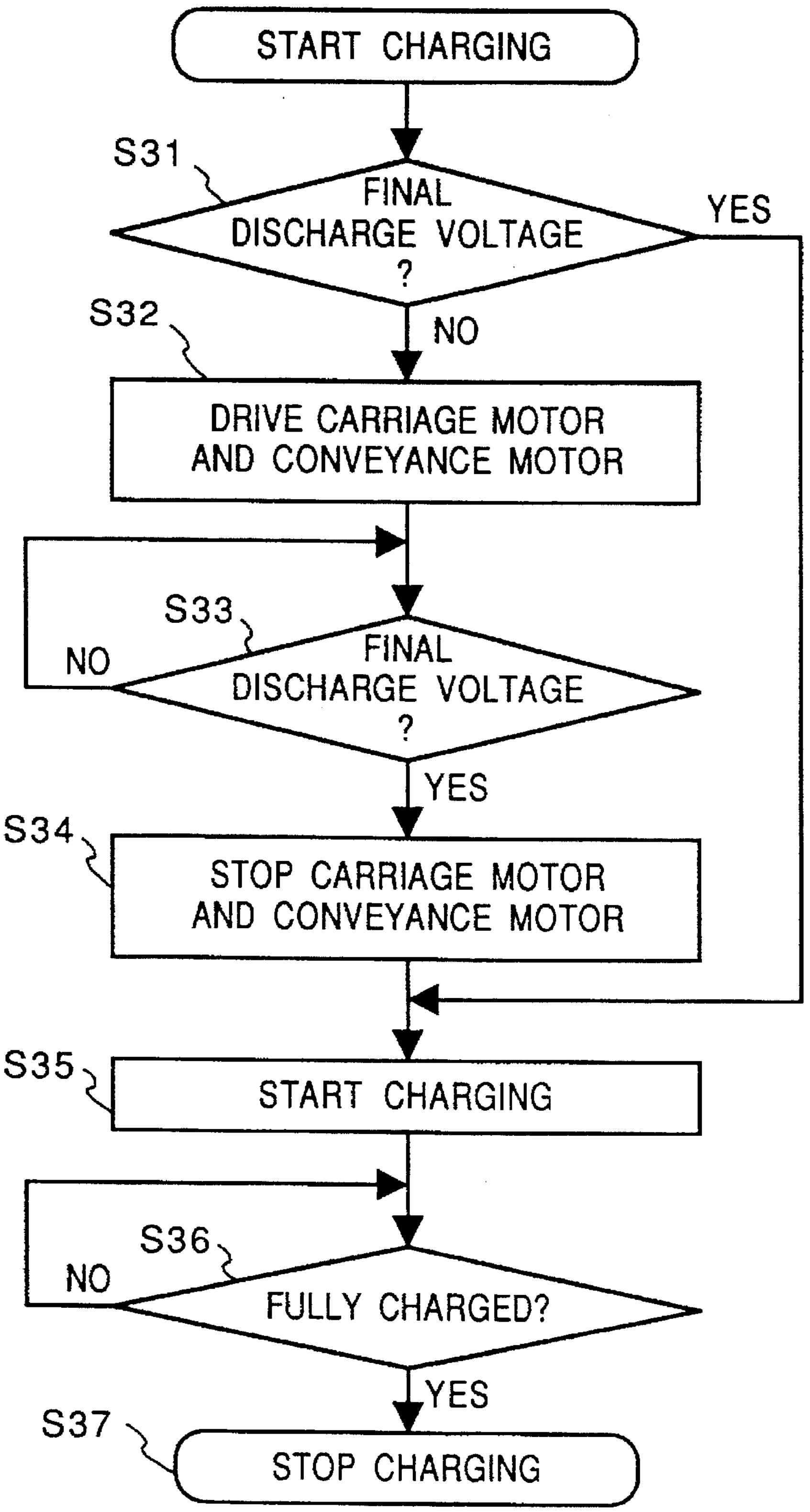
FIG. 15 is a flowchart showing a control procedure of another modification of the third embodiment.

Further, in FIG. 15, the carriage motor 8 and paper-feed motor 10 are driven simultaneously, thereby increasing the amount of power consumption to hasten consumption of the battery 20. It should be noted that the flowcharts of FIGS. 14 and 15 are the same as the flowchart of FIG. 13 in all other aspects and that no further description of these flowcharts is necessary.

In accordance with the third embodiment, as described above, charging of the battery is started after the battery has fully attained the final discharge voltage, this being accomplished without providing anew a discharge circuit for discharging the battery. This makes it possible to prevent the memory effect and fully exploit the battery.

Further, according to the foregoing embodiment, the battery is discharged by driving the carriage motor 8 and paper-feed motor 10. However, an arrangement may be adopted in which current is passed through a load that consumes a large amount of current, such as the printing head or head restoration device, to accomplish discharge of the battery.

Furthermore, in the foregoing embodiment, a recording apparatus is described that is one of the ink-jet types, in which means (e.g., an electrothermal transducer or laser beam, etc.) is provided for generating thermal energy as energy utilized in order to jet ink, wherein a change in the state of the ink is caused by the thermal energy. With this arrangement, high-density, high-definition recording can be achieved.

With regard to a typical configuration and operating principle, it is preferred that the foregoing be achieved using the basic techniques disclosed in the specifications of U.S. Pat. Nos. 4,723,129 and 4,740,796. This scheme is applicable to both so-called on-demand-type and continuous-type apparatus. In the case of the on-demand type, at least one drive signal, which provides a sudden temperature rise that exceeds that for film boiling, is applied, in accordance with recording information, to an electrothermal transducer arranged to correspond to a sheet or fluid passageway holding a fluid (ink). As a result, thermal energy is produced in the electrothermal transducer to bring about film boiling on the thermal working surface of the recording head. Accordingly, air bubbles can be formed in the fluid (ink) in one-to-one correspondence with the drive signals. A jetting port is made to jet the fluid (ink) by growth and contraction of the air bubbles so as to form at least one droplet. If the drive signal has the form of a pulse, growth and contraction of the air bubbles can be made to take place rapidly and in appropriate fashion. This is preferred since it will be possible to achieve fluid (ink) jetting having excellent response. Signals described in the specifications of U.S. Pat. Nos. 4,463,359 and 4,345,262 are suitable as drive pulses having this pulse shape. It should be noted that even better recording can be performed by employing the conditions described in the specification of U.S. Pat. No. 4,313,124, which discloses an invention relating to the rate of increase in the temperature of the above-mentioned thermal working surface.

In addition to the combination of the jetting port, fluid passageway and electrothermal transducer (in which the fluid passageway is linear or right-angled) disclosed as the construction of the recording head in each of the above-mentioned specifications, the present invention covers also an arrangement using the art described in the specifications of U.S. Pat. Nos. 4,558,333 and 4,459,600, which disclose elements disposed in an area in which the thermal working portion is curved. Further, it is permissible to adopt an arrangement based upon Japanese Patent Application Laid-Open No. 59-123670, which discloses a configuration having a common slot for the jetting portions of a plurality of electrothermal transducers, or Japanese Patent Application Laid-Open No. 59-138461, which discloses a configuration having openings made to correspond to the jetting portions, wherein the openings absorb pressure waves of thermal energy.

The present invention is effective also in a case in which use is made of a recording head secured to the main body of the apparatus even in the serial-type arrangement of the foregoing example; a freely exchangeable tip-type recording head attached to the main body of the apparatus and capable of being electrically connected to the main body of the apparatus and of supplying ink from the main body; or a cartridge-type recording head in which an ink tank is integrally provided on the recording head itself.

With regard to the type of mounted recording head and the number thereof, only one head is provided in case of monochromatic ink, for example, and a plurality of heads are provided for corresponding ones of a plurality of inks of different color or density. More specifically, the recording mode of the recording apparatus is not limited merely to a recording mode for a mainstream color only, such as the color black. The recording head can have a unitary construction or a plurality of recording heads can be combined. The invention is effective also in an apparatus having at least one recording mode for a plurality of different colors or for full-color recording using mixed colors.

Further, ink is described as being the fluid in the embodiments of the invention set forth above. The ink used may be one which solidifies at room temperature or lower, or one which softens of liquefies at room temperature. Alternatively, in an ink-jet arrangement, generally the ink is temperature-controlled by regulating the temperature of the ink itself within a temperature range of between 30° C. and 70° C. so that the viscosity of the ink will reside in a region that allows stable jetting of the ink. Therefore, it is permissible to use an ink liquefied when the recording signal is applied. In order to positively prevent elevated temperature due to thermal energy when this is used as the energy for converting the ink from the solid state to the liquid state, or in order to prevent evaporation of the ink, it is permissible to use an ink which solidifies when left standing but which liquefies when heated. In any case, the present invention is applicable also in a case where use is made of an ink which solidifies in response to application of thermal energy, such as an ink solidified by application of thermal energy conforming to a recording signal or ink which has already begun to solidify at the moment it reaches the recording medium. Such inks may be used in a form in which they oppose the electrothermal transducer in a state in which they are held as a liquid or solid in the recesses or through-holes of a porous sheet, as described in Japanese Patent Application Laid-Open Nos. 54-56847 and 60-71260. In the present invention, the most effective method of dealing with these inks is the above-described method of film boiling.

Furthermore, as to the form of the recording apparatus, use is not limited to an image output terminal of an image processing apparatus such as a computer. Other configurations include a copying machine in combination with a reader or the like, a facsimile machine having a transmitting/receiving function, etc.

It goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus driven by a supply of power from a battery, said apparatus comprising:
- detecting means for detecting a remaining capacity of the battery;
- a carriage motor for moving, relative to a printing medium, a printing head that prints an image on the printing medium;
- a conveyance motor for conveying the printing medium relative to the printing head; and
- drive control means for changing a drive timing of said carriage motor and a drive timing of said conveyance motor based upon results of a detection performed by said detecting means,
- wherein when the remaining capacity of the battery detected by said detecting means is not less than a predetermined value, said drive control means commences accelerative driving of one motor, during decelerative driving of the other motor, and when the remaining capacity of the battery detected by said detecting means is less than the predetermined value, said drive control means commences accelerative driving of one of said carriage motor and said conveyance motor, after completion of decelerative driving of the other motor.

2. The apparatus according to claim 1, wherein said detecting means detects the remaining capacity of the battery while a current is passed through at least one of said carriage motor and said conveyance motor.

3. The apparatus according to claim 1, wherein the printing head is an ink jetting head and has capping means for capping nozzles of the ink jetting head, the capping of the nozzles by the capping means being maintained when the remaining capacity of the battery detected by said detecting means is less than a second predetermined value less than the first predetermined value.

4. A printing apparatus driven by a supply of power from a battery, comprising:
- detecting means for detecting a charged quantity of the battery;
- charging means for electrically charging the battery;
- designating means for designating a quantity of printing mediums to be printed on; and
- charging control means for controlling said charging means so as to electrically charge the battery until the charged quantity of the battery becomes a quantity necessary to print the quantity of the printing mediums designated by said designating means.

5. The apparatus according to claim 4, further comprising memory means for storing the charged quantity of the battery in correspondence with the designated quantity of printing mediums to be printed on, said charging control means referring to the charged quantity stored in said memory means and performing control in such a manner that electric charging in accordance with the quantity of printing mediums designated by said designating means is performed.

6. The apparatus according to claim 4, further comprising indicating means, controlled by said charging control means, for indicating that the battery is being charged.

7. A printing apparatus driven by a supply of electric power from a battery, said apparatus comprising:
- detecting means for detecting a charged quantity of the battery;
- a drive motor for driving a mechanism of said printing apparatus by the electric power supply from the battery;
- determining means for determining whether or not the charged quantity of the battery is less than a predetermined quantity at which an output voltage of the battery becomes less than a final discharge voltage, based on a detection by said detecting means; and
- discharging means for driving said drive motor by the electric power supply from the battery, to electrically discharge the battery so that the output voltage of the battery becomes less than the final discharge voltage before electrically charging the battery, in a case where said detecting means detects that the charged quantity is not less than the predetermined quantity.

8. The apparatus according to claim 7, further comprising designating means for designating charging of the battery.

9. The apparatus according to claim 7, wherein said drive motor comprises a carriage motor for moving a printing head, which prints an image on a printing medium, relative to the printing medium.

10. The apparatus according to claim 7, wherein said drive motor comprises a motor for conveying a printing medium relative to a printing head that prints an image on the printing medium.

11. The apparatus according to claim 7, wherein said drive motor comprises a carriage motor for moving a printing head, which prints an image on a printing medium, relative to the printing medium and a motor for conveying the printing medium relative to the printing head.

12. A method of electrically charging a battery in a printing apparatus driven by a supply of power from the battery, said method comprising the steps of:

designating a quantity of printing mediums to be printed on;

obtaining an electrically charging quantity of the battery in accordance with the quantity of printing mediums designated in said designating step; and electrically charging the battery up to the charging quantity obtained in said obtaining step.

13. A method of electrically charging a battery in a printing apparatus driven by a supply of electric power from the battery, said method comprising the steps of:

detecting a charged quantity of the battery;

determining whether or not the charged quantity detected in said detecting step is less than a predetermined quantity in which an output voltage of the battery becomes less than a final discharge voltage;

driving at least one drive motor that drives a mechanism of the printing apparatus by the electric power supply from the battery, to electrically discharge the battery so that the output voltage of the battery becomes less than the final discharge voltage, before electrically charging the battery, in a case where it is determined that the charged quantity of the battery is not less than the predetermined quantity determined in said determining step; and starting charging of the battery after discharging of the battery has been substantially completed.

14. The method according to claim 13, wherein the at least one drive motor includes a carriage motor for moving a printing head, which prints an image on a printing medium, relative to the printing medium and a conveyance motor for conveying the printing medium relative to the printing head, said driving step including rotating at least one of the carriage motor and the conveyance motor.

15. The method according to claim 13, wherein the at least one drive motor includes a carriage motor for moving a printing head, which prints an image on a printing medium, relative to the printing medium and a conveyance motor for conveying the printing medium relative to the printing head, said driving step including rotating both the carriage motor and the conveyance motor.

16. A printing apparatus driven by a supply of electric power from a battery, said printing apparatus comprising:

detecting means for detecting a remaining capacity of the battery;

a carriage motor for moving a printing head, which prints an image on a printing medium, relative to the printing medium;

a conveyance motor for conveying the printing medium relative to the printing head; and drive control means for controlling a drive timing of said conveyance motor based on the remaining capacity of the battery detected by said detecting means;

wherein said drive control means commences driving of said conveyance motor at a first timing in which rotation of said carriage motor does not stop after a deceleration of rotation speed of said carriage motor was started when the remaining capacity of the battery detected by said detecting means is more than a predetermined value, and said drive control means commences driving of said conveyance motor at a second timing after the first timing when the remaining capacity of the battery detected by said detecting means is less than the predetermined value.

17. A printing apparatus according to claim 16, wherein the second timing is a timing after a rotation of said carriage motor has been stopped.

18. A printing apparatus according to claim 16, further comprising stopping means for stopping an operation of said printing apparatus when the remaining capacity of the battery detected by said detecting means becomes less than the predetermined value.

19. A printing apparatus according to claim 16, wherein the printing head has energy generating devices for generating energy to eject ink drops, and ink ejecting nozzles provided in correspondence with the energy generating devices, wherein the printing head prints an image on the printing medium by ejecting ink drops from the ink ejecting nozzles.

20. A printing apparatus according to claim 19, wherein the printing head brings about film boiling in the ink by heat energy from the energy generating devices and ejects the ink drops from the ink ejecting nozzles by causing a status of ink to change by the film boiling.

21. A printing apparatus driven by a supply of electric power from a battery, said printing apparatus comprising:

detecting means for detecting a remaining capacity of the battery;

a carriage motor for moving a printing head, which prints an image on a printing medium, relative to the printing medium;

a conveyance motor for conveying the printing medium relative to the printing head; and drive control means for controlling a drive timing of said carriage motor based on the remaining capacity of the battery detected by said detecting means;

wherein said drive control means commences driving of said carriage motor at a first timing in which rotation of said conveyance motor does not stop after a deceleration of rotation speed of said conveyance motor was started when the remaining capacity of the battery detected by said detecting means is more than a predetermined value, and said drive control means commences driving of said carriage motor at a second timing after the first timing when the remaining capacity of the battery detected by said detecting means is less than the predetermined value.

22. A printing apparatus according to claim 21, wherein the second timing is a timing after the rotation of said conveyance motor has been stopped.

23. A printing apparatus according to claim 21, further comprising stopping means for stopping a printing operation using the printing head when the remaining capacity of the battery detected by said detecing means becomes less than the predetermined value.

24. A printing apparatus according to claim 21, wherein the printing head has energy generating devices for generating energy to eject ink drops, and ink ejecting nozzles provided in correspondence with the energy generating devices, wherein the printing head prints an image on the printing medium by ejecting ink drops from the ink ejecting nozzles.

25. A printing apparatus according to claim 24, wherein the printing head brings about film boiling in the ink by heat energy from the energy generating devices and ejects the ink drops from the ink ejecting nozzles by causing a status of ink to change by the film boiling.

26. A printing apparatus driven by a supply of electric power from a battery, said printing apparatus comprising:

detecting means for detecting a remaining capacity of the battery;

a carriage motor for moving a printing head, which prints an image on a printing medium, relative to the printing medium;

a conveyance motor for conveying the printing medium relative to the printing head; and drive control means for controlling a drive timing of one of said conveyance motor and said carriage motor based on the remaining capacity of the battery detected by said detecting means;

wherein said drive control means commences driving of one of said conveyance motor and said carriage motor at a first timing in which a time period of accelerative driving of one of said conveyance motor and said carriage motor, and a time period of decelerative driving of the other of said conveyance motor and said carriage motor are overlapped, when the remaining capacity of the battery by said detecting means is more than a predetermined value, and a driving of one of said conveyance motor and said carriage motor, is commenced at a second timing, after the first timing, when the remaining capacity of the battery detected by said detecting means is less than the predetermined value.

27. A printing apparatus according to claim 26, wherein the first timing is a timing in which rotation of one of said carriage motor and said conveyance motor does not stop after a deceleration of rotation speed of said one of said carriage motor and said conveyance motor was started.

28. A printing apparatus according to claim 26, wherein the second timing is a timing after a rotation of said one of said carriage motor and said conveyance motor has been stopped.

29. A printing apparatus according to claim 26, further comprising stopping means for stopping an operation of said printing apparatus when the remaining capacity of the battery detected by said detecting means becomes less than the predetermined value.

30. A printing apparatus according to claim 26, wherein the printing head has energy generating devices for generating energy to eject ink drops, and ink ejecting nozzles provided in correspondence with the energy generating devices, wherein the printing head prints an image on the printing medium by ejecting ink drops from the ink ejecting nozzles.

31. A printing apparatus according to claim 30, wherein the printing head brings about film boiling in the ink by heat energy from the energy generating devices and ejects the ink drops from the ink ejecting nozzles by causing a status of ink to change by the film boiling.

32. A method of controlling a drive timing of motors in a printing apparatus driven by a supply of electric power from a battery, said printing apparatus including a carriage motor for moving a printing head, which prints an image on a printing medium, relative to the printing medium, and a conveyance motor for conveying the printing medium relative to the printing head, said method comprising the steps of:

detecting a remaining capacity of the battery; and controlling a driving timing of one of said conveyance motor and said carriage motor based on the remaining capacity of the battery detected in said detecting step;

wherein in said controlling step, driving of one of said conveyance motor and said carriage motor is commenced at a first timing in which a time period of accelerative driving of one of said conveyance motor and said carriage motor, and a time period of decelerative driving of the other of said conveyance motor and said carriage motor are overlapped, when the remaining capacity of the battery in said detecting step is more than a predetermined value, and driving of one of said conveyance motor and said carriage motor is commenced at a second timing, after the first timing, when the remaining capacity of the battery detected in said detecting step is less than the predetermined value.

33. A method according to claim 32, wherein the first timing is a timing in which rotation of one of said carriage motor and said conveyance motor does not stop after a deceleration of rotation speed of said one of said carriage motor and said conveyance motor was started.

34. A method according to claim 32, wherein the second timing is a timing after a rotation of one of said carriage motor and said conveyance motor has been stopped.

35. A method according to claim 32, further comprising a step of stopping an operation of said printing apparatus when the remaining capacity of the battery detected in said detecting step becomes less than the predetermined value.

36. A method according to claim 32, wherein the printing head has energy generating devices for generating energy to eject ink drops, and ink ejecting nozzles provided in correspondence with the energy generating devices, wherein the printing head prints an image on the printing medium by ejecting ink drops from the ink ejecting nozzles.

37. A method according to claim 36, wherein the printing head brings about film boiling in the ink by heat energy from the energy generating devices and ejects the ink drops from the ink ejecting nozzles by causing a status of ink to change by the film boiling.

* * * * *

UNITED STATES PATENT AND TRADEMARK OFFICE

CERTIFICATE OF CORRECTION

PATENT NO. : 5,631,677 Page 1 of 2

DATED : May 20, 1997

INVENTOR(S) : Horigome et al.

It is certified that error appears in the above-identified patent and that said Letters Patent is hereby corrected as shown below: Title page, item

[56] References Cited:

FOREIGN PATENT DOCUMENTS

"1110178 4/1989 Japan
1186354 7/1989 Japan
1190471 7/1989 Japan" should read
--1-110178 4/1989 Japan
1-186354 7/1989 Japan
1-190471 7/1989 Japan--; and
"04090360 3/1992 Japan
04103380 4/1992 Japan" should read
--4-090360 3/1992 Japan
4-103380 4/1992 Japan--.

COLUMN 4:

Line 31, "an" should be deleted.

COLUMN 11:

Line 2, "capped" should read --capped by--; and
Line 7, "here" should read --here is--.

UNITED STATES PATENT AND TRADEMARK OFFICE
CERTIFICATE OF CORRECTION

PATENT NO. : 5,631,677 Page 2 of 2

DATED : May 20, 1997

INVENTOR(S) : Horigome et al.

It is certified that error appears in the above-identified patent and that said Letters Patent is hereby corrected as shown below:

COLUMN 12:

Line 49, "of" (first occurrence) should be deleted.

Signed and Sealed this

Eighteenth Day of November 1997

Attest:

BRUCE LEHMAN

Attesting Officer

*Commissioner of Patents and Trademarks*